US006963925B1

United States Patent
Ishikawa et al.

(10) Patent No.: US 6,963,925 B1
(45) Date of Patent: Nov. 8, 2005

(54) GATEWAY APPARATUS AND THE METHOD THEREOF

(75) Inventors: Akira Ishikawa, Kanagawa (JP); Teruki Niki, Tokyo (JP); Takashi Mitoh, Saitama (JP); Masaomi Ueda, Saitama (JP); Tetsuya Hino, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 629 days.

(21) Appl. No.: 09/603,698

(22) Filed: Jun. 26, 2000

(30) Foreign Application Priority Data

Jun. 24, 1999 (JP) ............................................ 11-177916

(51) Int. Cl.[7] ............................................ G06F 15/173
(52) U.S. Cl. ........................ 709/238; 709/250; 709/227; 709/249; 709/232
(58) Field of Search ............................... 709/250, 227, 709/249, 232, 238

(56) References Cited

U.S. PATENT DOCUMENTS 6,079,020 A * 6/2000 Liu .............................. 713/201
6,496,862 B1 * 12/2002 Akatsu et al. ................ 709/224
6,523,696 B1 * 2/2003 Saito et al. .................. 709/223
6,584,096 B1 * 6/2003 Allan ........................... 370/352

OTHER PUBLICATIONS

Peter M. Corcoran "Mapping Home–Network Appliances to TCP/IP Sockets Using A Three–Tiered Home Gateway Architecture" Jun. 17, 1998, IEEE, pp. 729–736.*

* cited by examiner

Primary Examiner—Zarni Maung
Assistant Examiner—Sahera Halim
(74) Attorney, Agent, or Firm—RatnerPrestia

(57) ABSTRACT

A gateway realizes a connection between a network where HAVi devices are hooked up and another network in accordance with a Play-and-Plug spec. (e.g. the internet protocol (IP)) other than the HAVi spec. An HAVi plug-in detector detects a plug-in of a device to the HAVi network. A virtual device functions as a gateway for accessing from a device plugged-in the IP network to the device plugged-in the HAVi network. A virtual device controller provides the virtual device with an IP identifier for accessing to the virtual device from the IP network, and turns the virtual device to a standby status waiting for connection. A pseudo address generator generates a pseudo address for the virtual device to communicate with the device in the HAVi network, and provides the virtual device with the pseudo address. An address-correspondence-controller controls the correspondence between an HAVi address and the IP identifier both provided to the virtual device.

14 Claims, 22 Drawing Sheets

FIG. 4
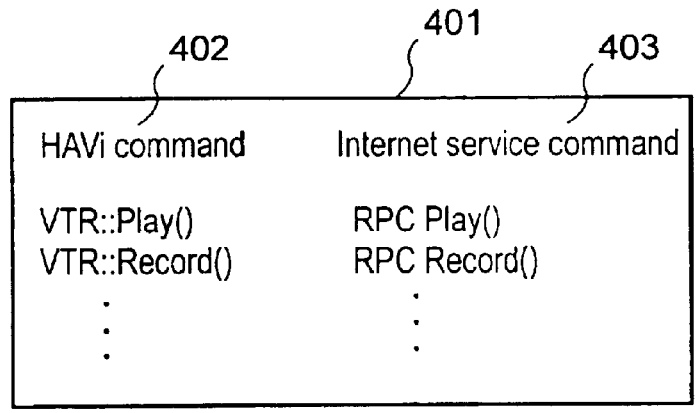
| HAVi command | Internet service command |
|---|---|
| VTR::Play() | RPC Play() |
| VTR::Record() | RPC Record() |
| ⋮ | ⋮ |
FIG. 5
| Connection | HAVi-side address | Internet-side address |
|---|---|---|
| Virtual VTR-IP client 1 | 10-2 | 192. 0. 0 1:8080 |
| Virtual VTR-IP client 2 | 10-3 | 192. 0. 0 1:8080 |
| Virtual DTV-IP client 3 | 10-4 | 192. 0. 0 1:8081 |
FIG. 6
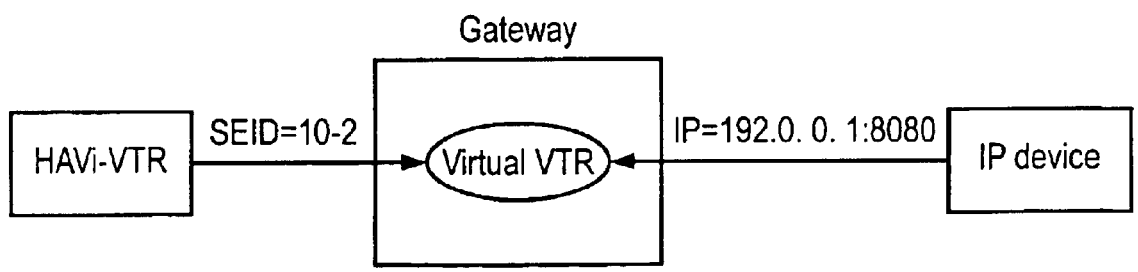

FIG. 12

| Connection | HAVi-side address | Internet-side address |
|---|---|---|
| HAVi client-Virtual printer | 10-5 | 192. 0. 0 1 |

FIG. 13

| Service | HAVi HUID | Internet service ID |
|---|---|---|
| IP network printer | 10-5 | 12E83420A |

Sequence diagram (disconect)

| FCM HUID | FCM Plug No, | PCR No, | IP Port No, |
|---|---|---|---|
| 10-6 | 0 | 0.1 | 8082 |
| 10-7 | 1 | 2 | 8083 |

2001  2002  2003  2004  2005

HUID XXXX

| Element Type | Label | Element ID |
|---|---|---|
| DDi Panel | VTR operation | 0 |
| DDi Button | PLAY | 1 |
| DDi Button | RECORD | 2 |

```
If(Event==Play_Pressed) then{
  CallDDi(1,Pressed);
}
elseif(Event==Record_Pressed)then{
  CallDDi(2,Pressed);
}
```

FIG. 28

| Manufacturer | Device No, | URL | Current Version |
|---|---|---|---|
| XXXXXX | 1234AZ1 | http://www.[ ].[ ]/1234AZ1/vdevise.exe | 1.02 |

GATEWAY APPARATUS AND THE METHOD THEREOF

FIELD OF THE INVENTION

The present invention relates to a gateway (GW) device which realizes communications between a plurality of electronic devices hooked up to a network (HAVi network)—the devices being in accordance with the specification of the Home Audio/Video (HAVi) architecture—and other devices hooked up to another network, e.g. the internet. The present invention also relates to a method of the gateway.

BACKGROUND OF THE INVENTION

HAVi is a middle ware—a software disposed between an application and an OS—and allows home-use audio/video devices (AV devices) to be controlled. The controlling targets of HAVi are the audio/video devices in accordance with IEEE 1394. The HAVi specification has disclosed an inter-operation by linking AV devices with each other as well as a Plug-and-Play function that allows users to operate AV devices just by hooking up the devices to the HAVi network.

The HAVi specification in detail is introduced in the HAVi Specification-Specification of the Home Audio Video Interoperability (HAVi) Architecture, Version 1.0 beta, available from HAVi, Inc. of San Ramon, Calif., USA. Meanwhile, various network-services in accordance with the internet protocol (IP) are available outside the homes, and an art realizing the Plug-and-Play among the devices hooked up to the internet has been already disclosed.

In order to realize a communication between the device on HAVi network and the device on the internet, the following problems should be overcome.

1. A gateway (GW) apparatus accommodating differences in physical specifications and network protocols is required. Because in these two factors, the HAVi devices following the communication protocol of HAVi specification and the devices (IP devices) on the internet following the internet protocol (IP) differ with each other.

To realize the "Plug-and-Play", in particular, between the HAVi devices and the IP devices, the following two problems, i.e. items 2 and 3, should be overcome.

2. In order to manipulate a device plugged in the IP network (second network) from the HAVi network (first network), a user should firstly be informed that the device in the IP network is plugged in. Next, a target address such as a Uniform Resource Locator (URL) and an appropriate communication protocol should be obtained. Then the user accesses to the IP device following a process required.

3. When a user wants to manipulate the HAVi device from the IP network, the user should firstly be informed that the HAVi device is plugged in. Next, the user should obtain a target address for accessing to the HAVi device and a connecting process.

4. A stream transfer of audio and video information is assumed in the HAVi specification, and the transfer is limited within the HAVi network. A method of transferring stream information between IP devices and HAVi devices is required.

5. The HAVi specification provides the users with a graphical user interface (GUI) for improving operability of the HAVi devices. Therefore, a method of utilizing the GUI from the outside of the HAVi network is required.

6. When a GW function is prepared for overcoming the first problem discussed above, the information available in a GW apparatus may be not enough for creating a reciprocal-conversion protocol between the HAVi network and another network.

SUMMARY OF THE INVENTION

The present invention addresses the problems discussed above and aims to provide a gateway (GW) apparatus and a GW method for allowing the HAVi devices and devices hooked up to another network, e.g. the internet, to communicate with each other.

The GW apparatus of the present invention comprises the following elements:

first message input/output means, being coupled to a first network, i.e. HAVi network hooking up a plurality of devices, for sending/receiving a message to/from the first network;

second message input/output means, being coupled to a second network hooking up a plurality of devices, for communicating to an IP device through an IP protocol used in the internet;

first plug-in detector for detecting a device being plugged in to the first network;

a virtual device for providing a GW function which allows a communication between a device on the first network and a device on the second network with each other;

a virtual device controller for providing the virtual device—corresponding to the device plugged in—with an IP identifier upon receiving a notice of plug-in from the first plug-in detector, the IP identifier indicating an address for accessing from the second network to the device plugged in, so that the virtual device is ready for a connection command;

a pseudo address generator for generating a pseudo address upon receiving a connection command from a device on the second network to allow the virtual device to communicate with a device on the first network; and an address correspondence controller for controlling correspondence between an address provided to the virtual device and an IP identifier for accessing from the second network.

The structure discussed above allows the communication between the devices hooked up to the first and second networks.

BRIEF DESCRIPTION OF THE DRAWINGS

FIG. 4 illustrates a command table showing correspondence between HAVi and IP in accordance with the first exemplary embodiment of the present invention.

FIG. 5 illustrates an address table showing correspondence between HAVi and IP in accordance with the first exemplary embodiment of the present invention.

FIG. 6 illustrates an address for accessing to a GW apparatus in accordance with the first exemplary embodiment of the present invention.

FIG. 12 is an address-table showing the correspondence between HAVi side and IP side in accordance with the second exemplary embodiment of the present invention.

FIG. 13 a service-table showing the correspondence between HAVi side and IP side in accordance with the second exemplary embodiment of the present invention.

FIG. 28 shows information down-loaded from a virtual device in accordance with the sixth exemplary embodiment of the present invention.

DESCRIPTION OF THE PREFERRED EMBODIMENTS

Exemplary Embodiment 1

A gateway (GW) apparatus in accordance with the first exemplary embodiment of the present invention is hereinafter demonstrated with reference to the accompanying drawings. All the descriptions in this embodiment are in accordance with the specification of HAVi 1.0 beta; however, the present invention is not limited to an edition of HAVi.

Figure 1:
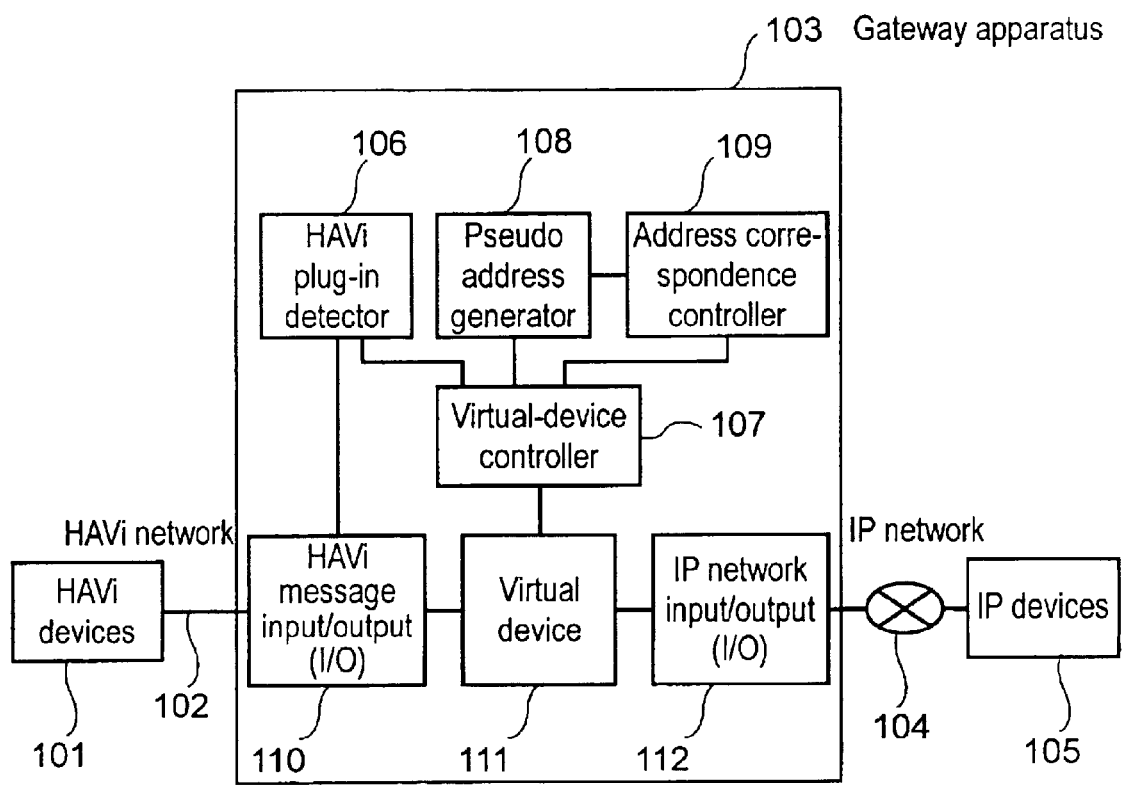
FIG. 1 is a block diagram showing a function of a GW apparatus in accordance with a first exemplary embodiment of the present invention.

In FIG. 1, HAVi devices 101 include AV devices such as a digital television receiver (DTV), a video tape recorder (VTR) and the like. The AV devices are in accordance with the HAVi specification, and are connected to HAVi network (first network) 102. GW apparatus 103 is disposed between the IP network (second network) 104 and the HAVi network 102, and functions to allow the devices hooked up to the first and second networks to communicate with each other. GW apparatus is also equipped with a function corresponding to Full AV device (FAV) specified by the HAVi specification. The IP devices 105, i.e. the devices hooked up to the second network, include a network printer and other network devices.

HAVi plug-in detector 106 monitors an event broadcast to the HAVi network. When detector 106 detects a plug-in of an HAVi device, the detector informs virtual-device-controller 107 of the detection. Controller 107 prepares an address which allows the GW function using a virtual device to be valid, and makes the virtual device be on standby.

Pseudo address generator 108 generates addresses of the HAVi devices and IP devices for network entities to communicate with the virtual device. Address correspondence controller 109 controls the connections between the HAVi devices and IP devices as well as the correspondences of pseudo addresses supplied to respective devices. HAVi message input/output means 110 (first message input/output means) functions as an interface between the GW apparatus and the HAVi devices.

Virtual device 111 functions as a GW converting a communication protocol, thereby manipulating either the HAVi devices from the IP network or the IP devices from the HAVi network. IP netwok input/output means 112 (second network input/output means) functions as an interface between the virtual device and the IP network.

Figure 2:
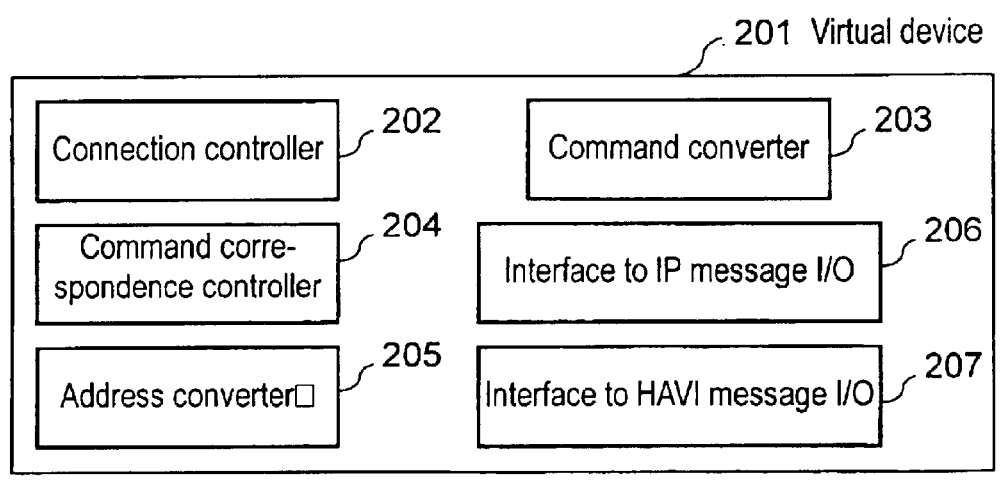
FIG. 2 is a structure of a virtual device in accordance with a first exemplary embodiment of the present invention.

The following description is referred to FIG. 2. Connection controller 202 controls the correspondences between the devices communicating over the GW. Command converter 203 converts commands supplied from the HAVi network and IP network into commands the targets can comprehend. The corresponding commands which command converter 203 refers to are controlled by command-correspondence-controller 204. The corresponding information to the commands may be controlled as a database stored outside the virtual device. If the corresponding information has been standardized in advance, general-purpose devices can be used as the virtual devices. Address converter 205 converts a target address and a source address, so that a message the GW receives can be transferred to another network. Interface 206 functions as an interface between the GW apparatus and IP network input/output means 112. Interface 207 functions as an interface between the GW apparatus and HAVi network input/output means 110.

An address structure of HAVi is described with reference to FIG. 3. HAVi address 301 comprises the following elements:

identifier (ID) 302 assigned to respective HAVi devices; and

ID 303 assigned for distinguishing HAVi software elements in the devices, and ID 303 is thus called a software element ID (SEID). The HAVi software element communicates with other software elements using the SEID. ID 302 assigned to an HAVi device is called a global unique ID (GUID) and is a 64-bit identifier specified by the global identifier (EU164) defined by IEEE. A Sw-Handle assigned for distinguishing a software element in a device is a 16-bit identifier. The SEID thus forms an 80-bit stream. In this first embodiment, the SEID of a combined GUID with Sw-Handle is described "GUID-Sw-Handle" in order to avoid a long description.

In a command-corresponding table of FIG. 4, HAVi command 402 corresponds to internet service command 403 on the same line. This information may be stored in an independent database, and this correspondence may be programmed.

In the table shown in FIG. 5—the table controlling the address-correspondence between the HAVi and the internet—column 502 stores a connection between the GW apparatus and IP devices communicating with the virtual HAVi device. The connection of column 503 on the same line indicates a corresponding address (SEID) of the HAVi side. Further, the same line of column 504 indicates an access identifier to the internet. In this example, it is assumed that the HAVi GUID of the GW apparatus is "10" and an identifier on the IP side is "192.0.0.1".

FIG. 6 shows an address used in the access to the GW apparatus from the HAVi and the IP side respectively. An address-assignment to a virtual VTR and IP client 1 is shown in FIG. 5. From the IP side, an access is done to the address of "192.0.0.1:8080", and the return access from an HAVi device is addressed to "10-2".

Figure 7:
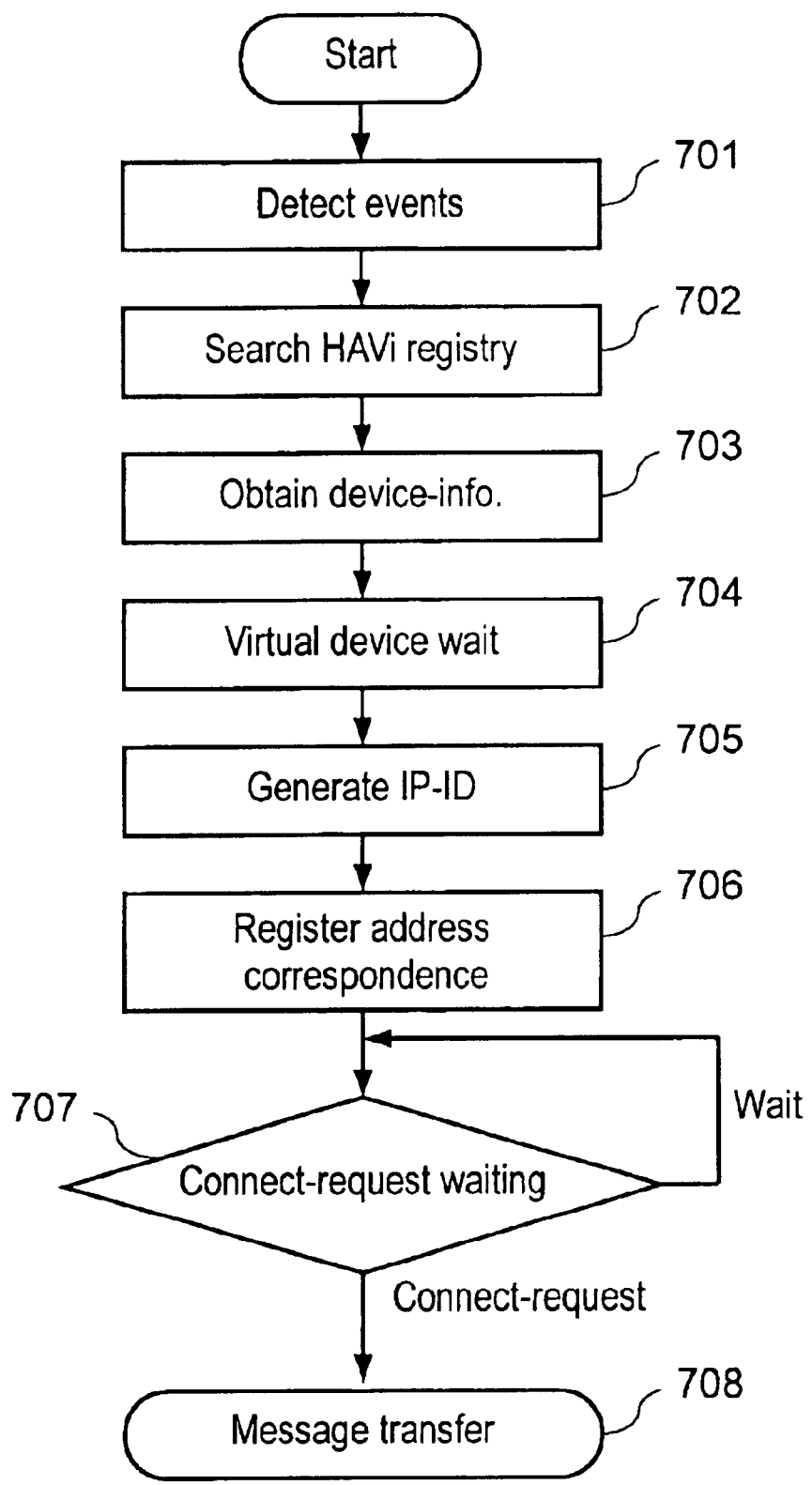
FIG. 7 is a flowchart showing a plug-in operation of the GW apparatus in accordance with the first exemplary embodiment of the present invention.

Based on the flowchart in FIG. 7, an operation of the GW apparatus when an HAVi device is plugged in the HAVi network is demonstrated with reference to FIGS. 1 and 2.

The HAVi device plugged in the HAVi network broadcasts the plug-in to the HAVi network and an event noticeable to the other HAVi devices, e.g. a new software element in HAVi 1.0 beta.

Plug-in detector 106 monitors this event, and when detector 106 detects the plug-in event, the detector obtains the HAVi address (SEID) of the plug-in device, the address being additional information to the event (step 701).

After obtaining the SEID, the detector searches an HAVi registry with a key of SEID (step 702).

The detector then obtains information attributive to the plugged-in device such as a type of device, a device ID, a maker ID (step 703).

Virtual device controller 107 prepares virtual device 111 appropriate to a GW for accessing to the plug-in device from the IP network, then makes device 111 being on standby (step 704).

The following methods are available for preparing the virtual device:

1. Select an appropriate device from GW programs prepared for various devices in advance.

2. Produce a virtual device dynamically based on the device information.

3. Inform a general-purpose GW program of the information about the plugged-in device, thereby operating the program appropriately.

FIG. 2 shows a structure of virtual device 111 to be a GW.

Virtual device controller 107 provides virtual device 111 with an identifier, i.e. an IP address, to start receiving an access from the IP side upon virtual device 111 turning to a standby status (step 705).

Then, the identifier is registered to address-correspondence-table 501 (step 706).

The GW apparatus is on standby waiting for a connection from the IP device (step 707).

The steps discussed above describe an operation-stream shown in FIG. 7.

Figure 8:
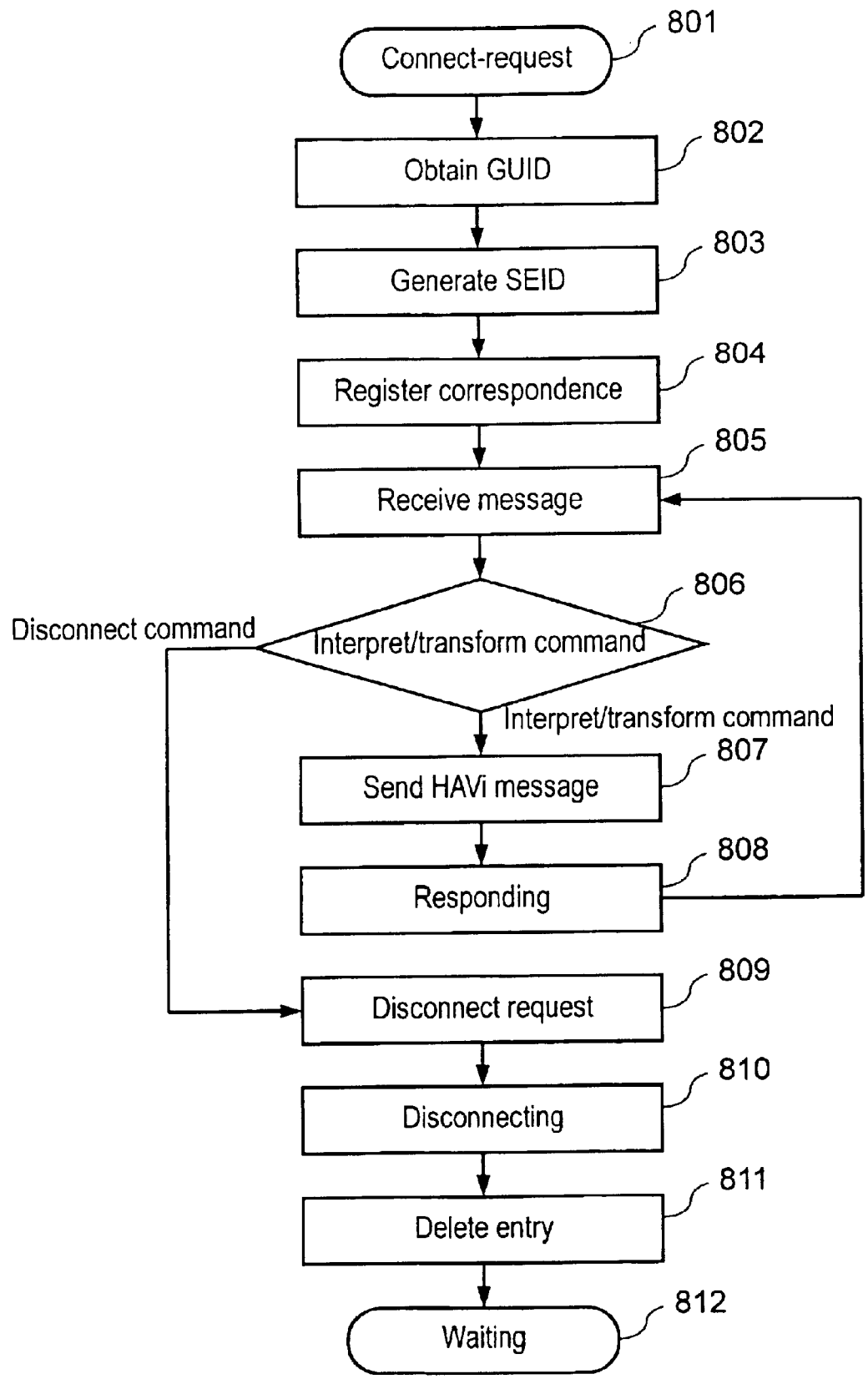
FIG. 8 is a flowchart illustrating an operation of the GW apparatus at receiving a connection command.

An operation of GW after the GW apparatus received a connection request from the IP device is described based on the flowchart of FIG. 8 with reference to FIG. 1 through FIG. 6.

When an access requirement is sent from the IP side (step 801), virtual device controller 107 requests pseudo-address-generator 108 to generate a virtual HAVi address in order to reply from the HAVi side via the GW to the requirement from the IP client.

Figure 3:
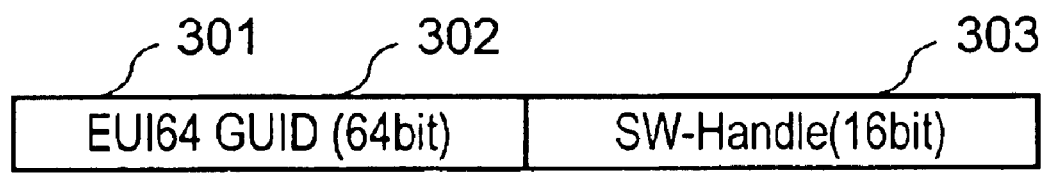
FIG. 3 illustrates a structure of a HAVi address.

The HAVi address comprises a Global Unique ID (GUID) and a Software Handle (SwHandle) as shown in FIG. 3. The GUID is to distinguish all the HAVi devices uniquely, and the SwHandle is an identifier for distinguishing the software element in an identical HAVi device from other software elements. The SwHandle is controlled in each HAVi device independently. This address system requires a pseudo address of the virtual device receiving the reply as a representative of the IP clients to be embodied the GUID as an HAVi compatible device of the GW apparatus including virtual device 111.

Therefore, pseudo-address-generator 108 obtains the GUID of the GW apparatus (step 802), and calculates and provides a SwHandle so that the HAVi address in the device is unique to the device (step 803).

Here, the SwHandle is calculated as follows:

1) Acquire pseudo addresses already used from the Address correspondence controller.

2) Then take the last 16 bit from each pseudo address acquired. They are SW-Handles already used.

3) Select the smallest positive integer excluding "SW-Handle"s reserved for HAVi system components and SW-Handles took out in 2) above.

4) HAVi pseudo address is generated by putting a device's own GUID on the first 64 bit and the "SW-Handle" on the last 16 bit selected in 3) above in HAVi address format as shown in FIG. 3.

This newly generated HAVi address is supplied to virtual device controller 107. In the same manner as shown in the address-corresponding-talbe in FIG. 5, controller 107 registers a combination of HAVi address 503, address 504 for accessing from the IP side, and a pair of the target devices 502 (HAVi device and an IP client) on address-corresponding-means 109 (step 804).

In this embodiment, the HAVi address is supplied to the virtual device at the access from the IP side; however, the address can be assigned to the device prior to the access from the IP side.

In an example shown in FIG. 5, the GUID of GW is assumed "10", the IP address is assumed "192. 0.0.1", and the HAVi device accessed by an IP client is assumed a VTR. In the GW apparatus, a plurality of virtual devices may sometimes wait for connections, therefore, a port ID number of the virtual VTR device is set at "8080" for distinguishing the present connections from possible connections. However, the connections are not necessarily controlled by a set of an IP address and a port number.

The virtual device obtains a message from the IP side after registering a correspondence between a connection and an address (step 805).

The virtual device converts the HAVi command corresponding to a command called from the IP side into HAVi command referring to the command-corresponding-table shown in FIG. 4 (step 806).

For instance, when an IP client calls a command of RPCPlay( ), the virtual device calls an HAVi command of VTR::Play( ) corresponding thereto.

When completing the command conversion, the virtual device drafts an HAVi message whose source HAVi address is the pseudo address assigned to the virtual device, and whose target is the HAVi address of the VTR to communicate with. Then the virtual device sends the message to the target HAVi device 101 using HAVi message input/output means 110 (step 807).

Device 101 (VTR) performs a designated operation upon receiving the message, and sends a reply-message to the virtual device of the GW if necessary.

The communication is forwarded in the same manner until the connection is discontinued (step 805–step 808).

When either one of the HAVi devices or IP devices requires the connection be discontinued, the virtual device realizes the requirement (step 809) and closes the connections on the HAVi side and IP side respectively (step 810).

At the same time, address-correspondence-controller 109 deletes the entry from the address-correspondence-control-table (step 811).

Finally, the virtual device returns to the standby status if other connections to be dealt with do not exist.

In this first embodiment, the access from the IP network to the HAVi device is demonstrated; however, the access in the reverse order can be done in the same manner.

The GW apparatus in accordance with the first exemplary embodiment allows the IP devices and HAVi devices to communicate with each other.

Exemplary Embodiment 2

The second exemplary embodiment of the present invention is demonstrated with reference to FIG. 9–FIG. 13.

In GW apparatus 903 shown in FIG. 9, IP plug-in detector 909 obtains plug-in information of IP devices supplied from IP directory 915, and requests virtual device controller 907 to start an operation described below. Controller 907 has the following additional function to controller 107 described in the first embodiment.

The operation requested to controller 907 is this: Upon receiving a notice from detector 909, the virtual device requests HAVi registry registering means 914 to register a newly added IP device to HAVi registry 913 so that the newly added IP device can be recognized from the HAVi network.

HAVi registry 913 supplies device-directory within the HAVi network corresponding to the registry in the HAVi specification. Registry 913 also realizes a search with an HAVi address (SEID) and the information attributive to devices such as a type of devices, a maker, available functions, a nickname by a user. For instance, search the HAVi registry for a digital TV and the SEID of the digital TV hooked up to the HAVi network. The communication can be then started with this SEID.

IP directory 915 supplies interface information on the IP network for searching services and for utilizing the services.

The IP directory is not always controlled by one specific device intensively, but it may be controlled in the following manner.

1. Each device broadcasts its own plug-in information within the network.

2. When a device is searched, the device corresponding to the plug-in information replies.

Other elements including HAVi device 901, HAVi network 902, GW apparatus 903, IP network 904, IP device 905, address-correspondence-controller 906, psseudo-address-generator 908, HAVi message input/output means 910, virtual device 911 and. IP network 912 function in the same manner as those in the first embodiment.

FIG. 13 shows a service-correspondence-table which stores the correspondence between identifiers of HAVi network and IP network, where the service includes a printer and other devices.

Figure 9:
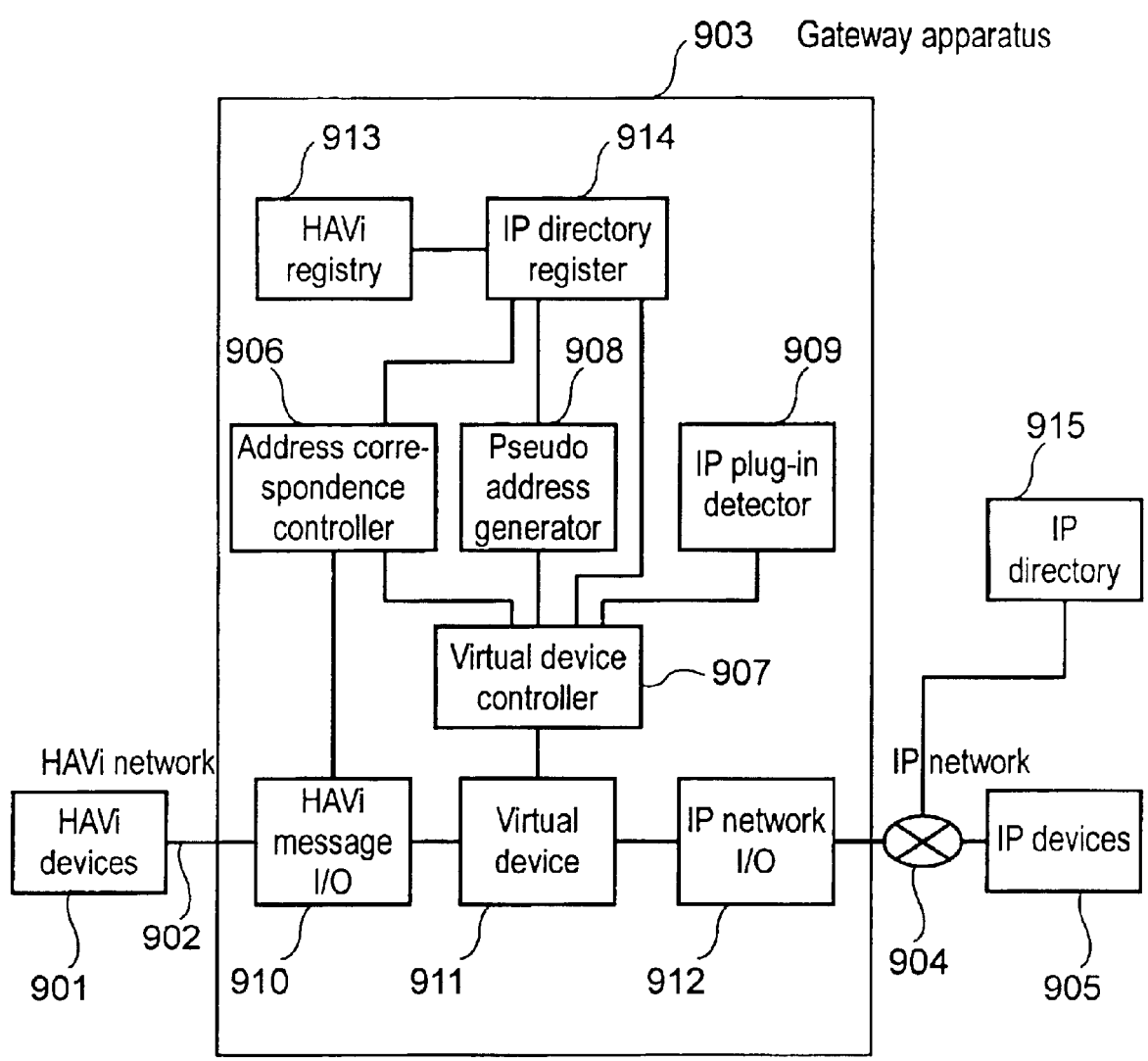
FIG. 9 is a block diagram illustrating a function of a GW apparatus in accordance with a second exemplary embodiment of the present invention.
Figure 10:
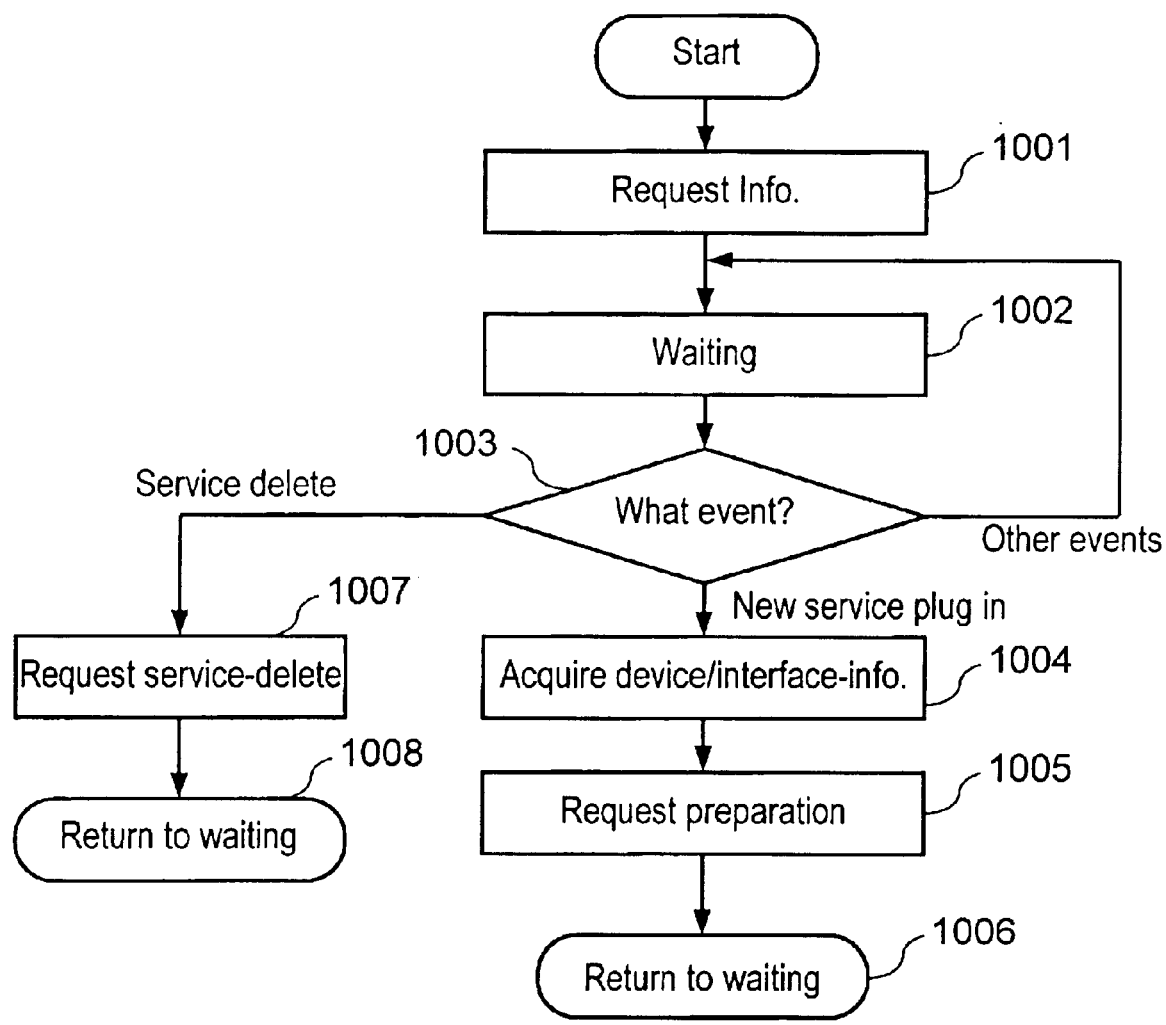
FIG. 10 is a flowchart illustrating an operation of an IP plug-in detector in accordance with the second exemplary embodiment of the present invention.
Figure 11A:
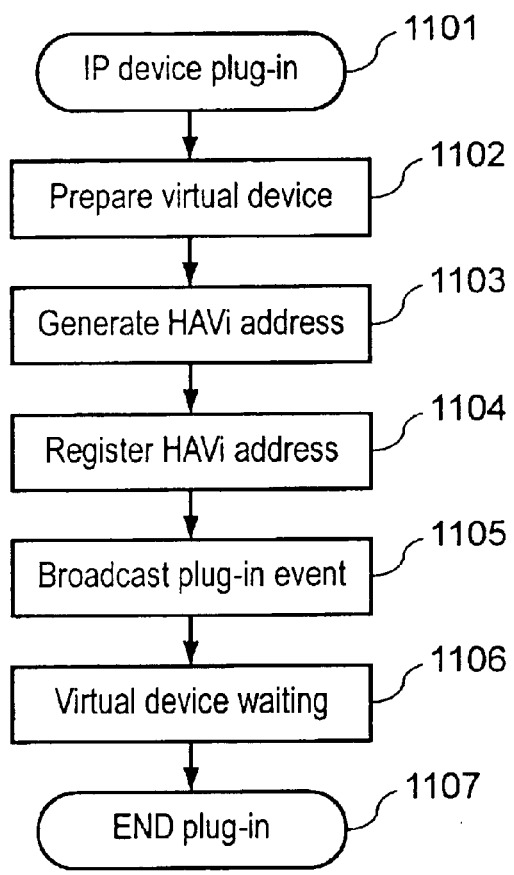
FIG. 11(a) is a flowchart illustrating an operation of a virtual device controller at plug-in in accordance with the second exemplary embodiment of the present invention.
Figure 11B:
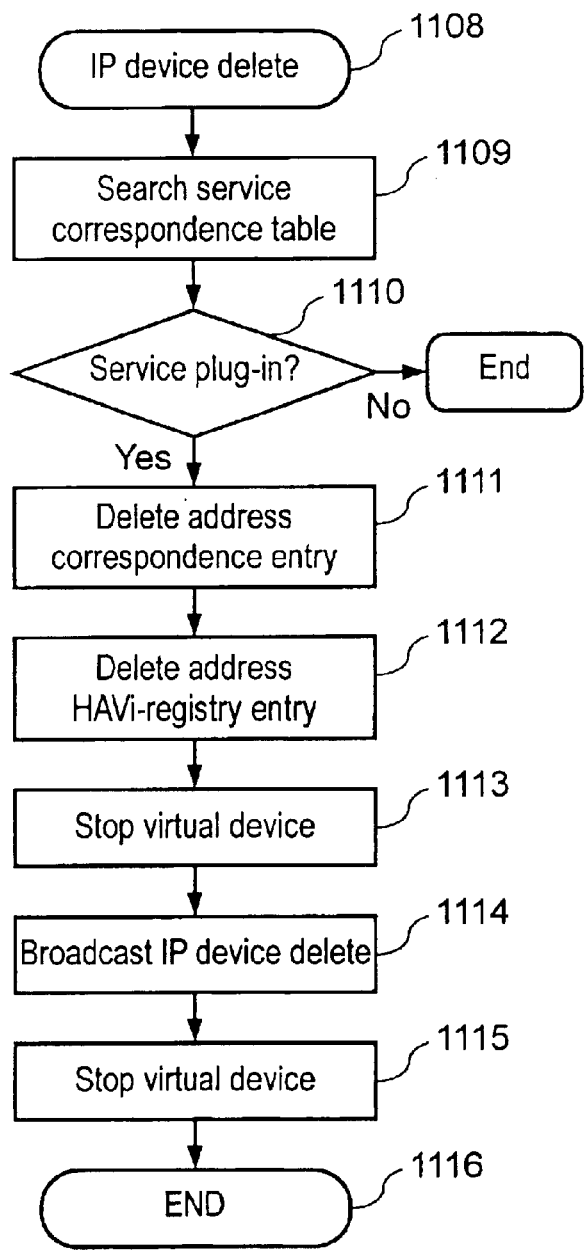
FIG. 11(b) is a flowchart illustrating an operation of the virtual device controller at removing a device in accordance with the second exemplary embodiment of the present invention.

An operation of GW apparatus 903 is demonstrated based on the flowcharts shown in FIGS. 10 and 11 with reference to FIG. 9, FIG. 12 and FIG. 13. First, an operation of IP plug-in detector is demonstrated hereinafter with reference to FIG. 10.

IP plug-in detector 909 requests IP directory 915—functioning as a directory server for searching services on the IP side—to notify an event about plug-in and plug-out of an IP device (step 1001). Necessity of requesting a notice depends on he specification of Plug-and-Play.

After the request, detector 909 turns to standby status waiting for a notice (step 1002).

IP device 905 requests IP directory 915 to plug-in using a protocol for plug-in the IP directory, and registers necessary data such as device data, interface data and a service identification.

IP directory 915 determines whether or not the notified content meets the IP device 905, and notifies detector 909 of the plug-in event when directory 915 determines the event notice is necessary (step 1003).

In this second embodiment, a network printer is taken as an example and is plugged in IP network 904.

IP plug-in detector 909 analyzes the notice and determines the content (step 1003).

When the notice introduces a plug-in of a new service, detector 909 detects that the network printer has been plugged-in according to information additional to the event notice (step 1004).

Further, detector 909 requests virtual device controller 907 to prepare a virtual device which is supposed to provide a plugged-in device with a GW process (step 1005).

In this second embodiment, information about a type of a plugged-in device is obtained from additional information to the event notice; however, the HAVi devices can request for searching a registry, thereby triggering the IP side to search the registry for the directory information.

An operation of controller 907 when a new IP device is plugged in is demonstrated with reference to FIG. 11(*a*).

Upon receiving a request from detector 909, virtual device controller 907 inquires of IP directory 915 to obtain the interface information of the plugged-in device (step 1101).

The interface information can be obtained when a HAVi device searches for IP devices, or when the HAVi device receives a connection request via the GW apparatus.

The interface information includes device-dependent-information for controlling the device, i.e. the information written by script languages such as Hyper Text Makeup Language (HTML), Extensible Makeup Language (XML), or JAVAScript (Java and JavaScript are trademarks of Sun Microsystems, Inc.), programs supplying a user interface, and application programming interface (API) of device-control-method.

Virtual device controller 907 prepares virtual device 911 appropriate as GW based on the device information obtained as discussed above (step 1102).

The virtual device can be also prepared in this way: If a standard is available for inter-operations of HAVi devices and the like in different Plug-and-Play specifications, the virtual devices according to this standard for the inter-operations could be prepared, and then appropriate devices could be selected responsive to a type of devices.

For instance, when a network printer is plugged in the IP side, a virtual device of network printer according to the inter-operation standard is selected. This inter-operations standard allows the network printer according to Jini spec. (Jini is the trademark of Sun Microsystems, Inc.) to be manipulated from the HAVi side.

Controller 907 obtains the HAVi address of the virtual device, i.e. SEID and HAVi Unique ID (HUID), using pseudo-address-generator 906 (step 1103). This is the same step as the one in the first embodiment.

The HAVi address obtained, i.e. SEID and HUID, are registered together with additional data of the devices to HAVi registry 913 (step 1104).

The HUID functions as an identifier of an eternal Software Element being not subjected to the influence from a network reset.

Next, HAVi registry 913 broadcasts a NewSoftwareElement global event which notifies the HAVi network of a newly plugged-in virtual HAVi device. This broadcasting saves the HAVi network a process of obtaining an IP address for manipulating a newly plugged-in IP devices.

Virtual device controller 907 registers a set of the HAVi address already supplied and ID information on the IP side to the address-correspondence-table via address-correspondence-controller 906 described in the first embodiment, then turns the virtual device to the standby status (step 1105).

FIG. 12 shows an address-correspondence-table. In this table, the virtual device functions as a GW of the network printer on the IP network, and the SEID viewed from the HAVi side is 10-5, and that viewed from the IP side is 192.0.0.1. Further, as shown in FIG. 13, this table controls the correspondence between identifiers of services (the network printer in this embodiment) on the internet and identifiers viewed from the HAVi side. The service identifiers on the internet are uniquely controlled by the directory service. For instance, the service ID of Jini is the case.

Upon receiving a command from the HAVi device, e.g. an output from an image printer, the virtual device converts the command and then sends the converted command to the IP network via IP network input/output means.

An operation at plugging-out an IP device is demonstrated with reference to the flowcharts shown in FIGS. 10 and 11.

When the event notice on step 1003 indicates a service-out, detector 909 requests controller 907 to carry out the service-out.

As illustrated in the flowchart in FIG. 11, the virtual device controller searches the service-correspondence-table shown in FIG. 13 (step 1109). Then the controller determines whether or not the service-out is still plugged-in (step 1110), and when the service is still plugged-in, the controller deletes the entry from the address-correspondence-table (step 1111). The controller also deletes the entry of HAVi registry 913 (step 1112), and stops the virtual device (step 1113). Then the controller broadcasts the GoneSoftwareElement global event which notifies the HAVi network of going out of SoftwareElement, thereby notifying the HAVi network of going out of the IP device (step 1114).

When the IP service is gone out (a device is removed from the network in this embodiment) through these steps, GW apparatus 903 follows this result and is deleted from the HAVi registry, thereby avoiding a mismatch.

The GW apparatus in accordance with the second embodiment as discussed above allows the HAVi devices to detect a device newly plugged-in the IP network as well as to obtain the interface information via the HAVi registry.

Exemplary Embodiment 3

A gateway (GW) apparatus of the present invention in accordance with another exemplary embodiment is demonstrated with reference to FIGS. 12–16.

Figure 14:
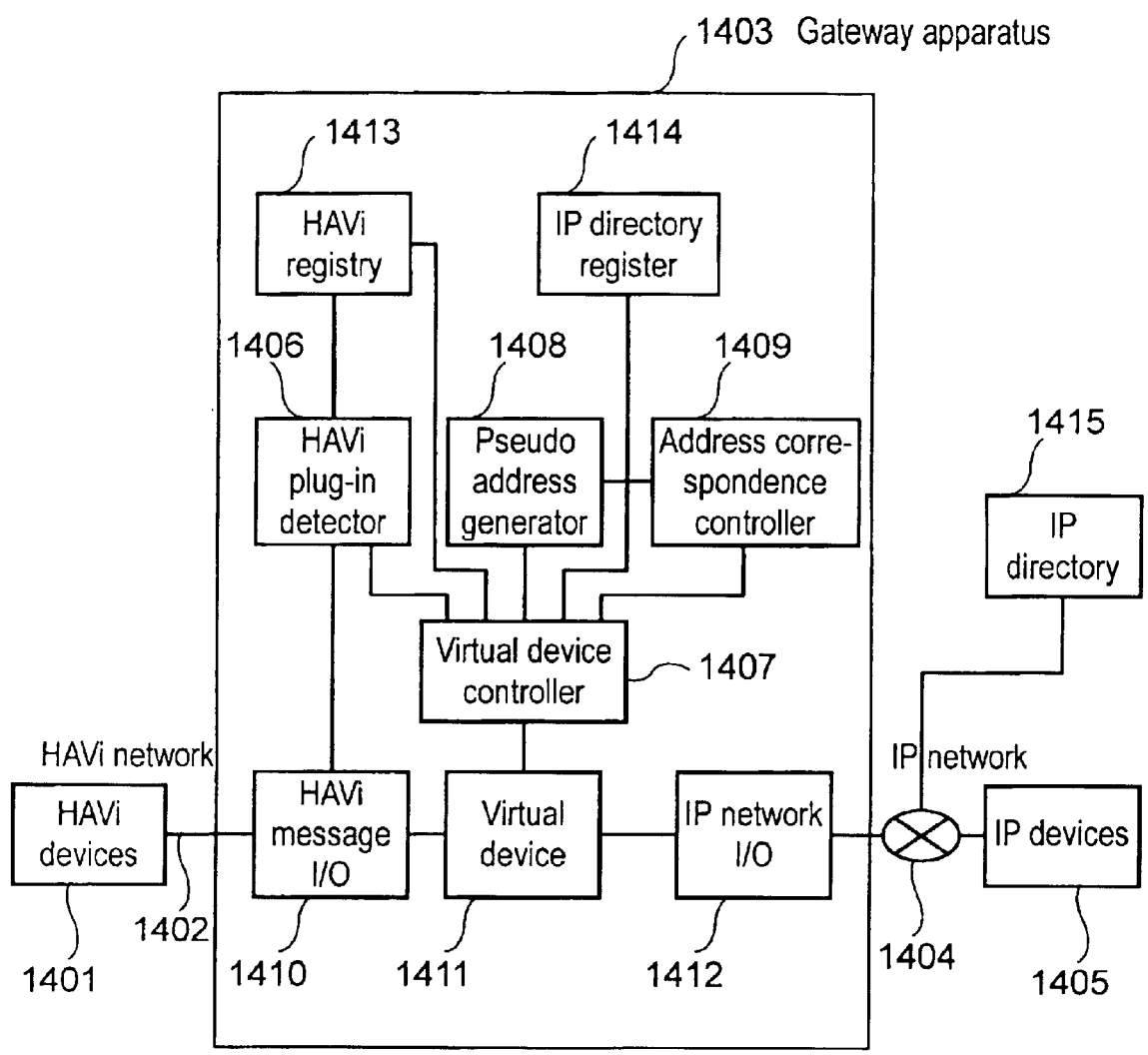
FIG. 14 is a block diagram illustrating a function of a GW apparatus in accordance with a third exemplary embodiment of the present invention.

FIG. 14 is a block diagram illustrating functions of the GW apparatus. HAVi plug-in detector 1406 monitors plug-in events being broadcast to the HAVi network, and obtains plug-in information of HAVi devices, then requests virtual device controller 1407 to start the operation described below. Controller 1407 has the following additional function to controller 907 described in the second embodiment. The operation requested to controller 1407 is this: Virtual device controller 1407 requests HAVi registry registering means 1414 to register a newly added HAVi device to IP registry 1415 so that the newly added HAVi device can be recognized from the IP network. IP directory 1415 and HAVi directory 1413 function as same as those do in the second embodiment. Other elements including HAVi device 1401, HAVi network 1402, GW apparatus 1403, IP network 1404, IP device 1405, address-correspondence-controller 1409, psseudo-address-generator 1408, HAVi message input/output means 1410, virtual device 1411 and IP network 1412 function in the same manner as those in the first embodiment.

Figure 15:
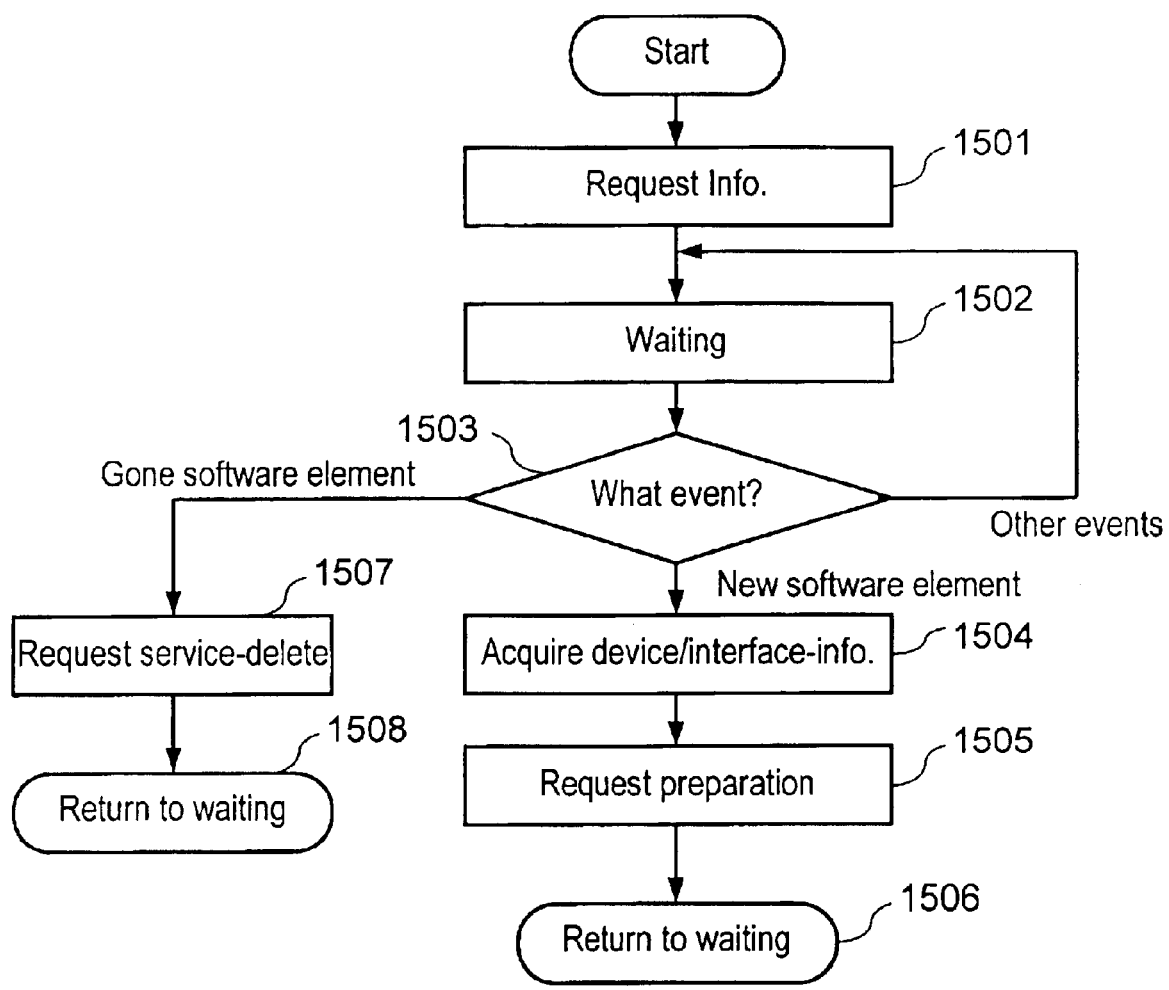
FIG. 15 is a flowchart illustrating an operation of a HAVi plug-in detector in accordance with the third exemplary embodiment of the present invention.
Figure 16A:
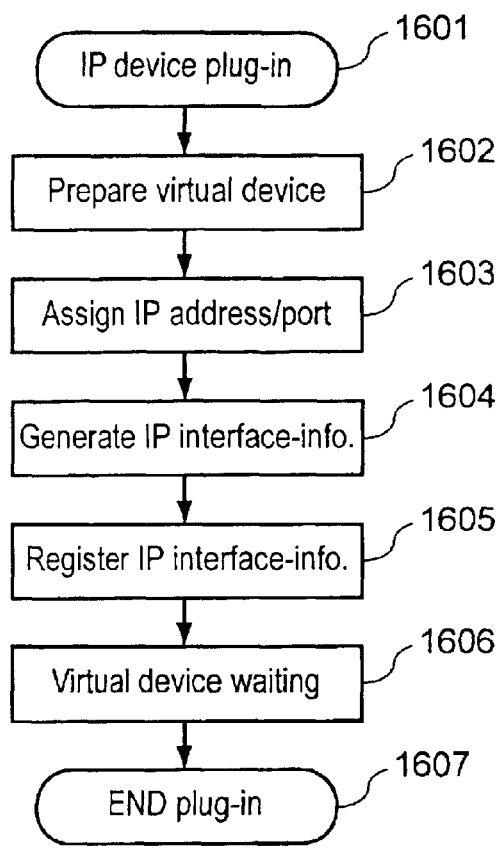
FIG. 16(a) is a flowchart illustrating an operation of a virtual device controller at plug-in in accordance with the third exemplary embodiment of the present invention.
Figure 16B:
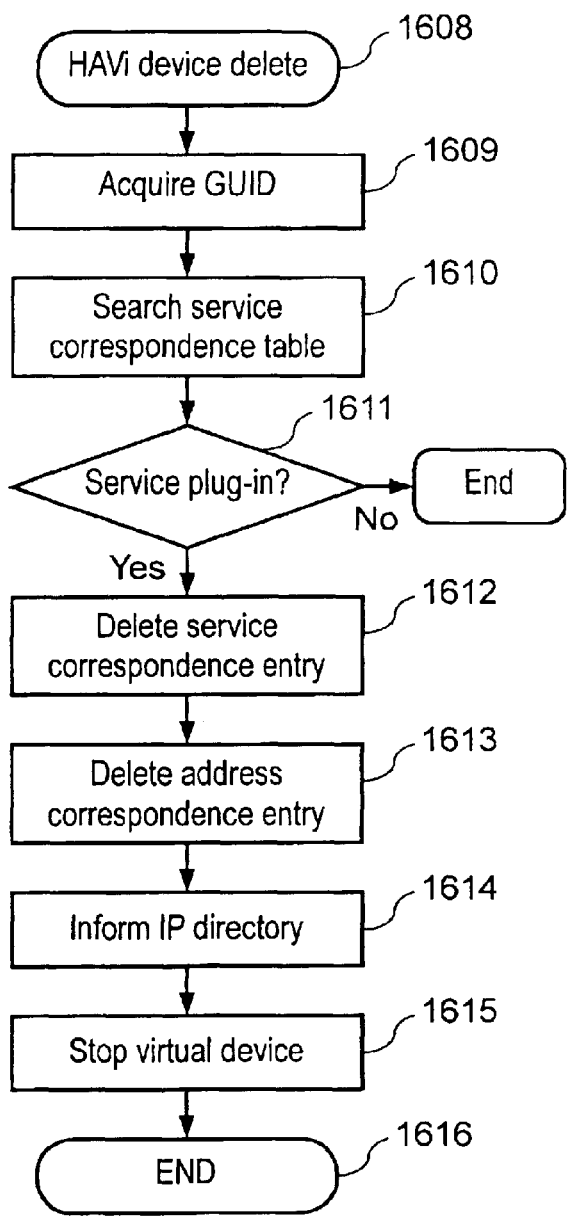
FIG. 16(b) is a flowchart illustrating an operation of the virtual device controller at removing a device in accordance with the third exemplary embodiment of the present invention.

Based on the flowcharts shown in FIGS. 15 and 16, an operation of the GW apparatus of the present invention is demonstrated with reference to FIG. 14, FIG. 12 and FIG. 13.

First, an operation of HAVi plug-in detector 1406 is demonstrated with reference to FIG. 15.

Detector 1406 requests an event controller of HAVi middle wear to monitor and notify an event to be broadcast to the HAVi network (step 1501).

In the HAVi specification, if an event is registered to EventManager of HAVi System Software Element which controls an input/output of HAVi events, the HAVi middle wear monitors a message travelling through the network, and notifies the SoftwearElement (the HAVi plug-in detector in this embodiment) of the target event when it is broadcast.

After the request, detector 1406 is turned to a standby status waiting for a notice (step 1502).

Upon being plugged-in, HAVi device 1401 registers its own information to "Registry"—a database of directory information of a device to be a host—as specified in the HAVi specification. The Registry broadcasts an event (NewSoftwareElement global event) all over the network to notify a new plug-in.

As described previously, detector 1406 obtains the event (NewSoftwareElement event) notifying the new plug-in via the HAVi middle wear (step 1503).

In this embodiment, a video-tape-recorder (VTR) is plugged-in to HAVi network 1402, for instance. Detector 1406 obtains information of a plug-in of the VTR from additional information of the notified event (step 1504).

Detector 1406, further, requests virtual-device-controller 1407 to prepare a virtual device in order to provide the plugged-in device with a GW process (step 1505).

Next, an operation of controller 1407 when an HAVi device is newly plugged-in is demonstrated with reference to FIG. 16.

Upon receiving the request from detector 1406, controller 1407 inquires HAVi registry 1413 to obtain the information about the plugged-in device such as a type of the device, HUID, a maker and the like. This information is not be always obtained at the same time as the plug-in.

Based on the device information obtained, controller 1407 prepares virtual device 1411 appropriate to the GW (step 1602).

The virtual device can be also prepared in this way: If a standard is available for inter-operations of HAVi and Jini, the virtual devices according to this standard for the inter-operations could be prepared, and then appropriate devices could be selected responsive to a type of devices.

For instance, when a VTR is plugged in the HAVi side, a virtual device of VTR according to the inter-operation standard is selected. This interoperations standard allows the VTR to be manipulated from the IP side.

Controller 1407 obtains an identifier, e.g. an IP address, a port number of the virtual device using pseudo-address-generator 1408 (step 1603). This is the same step as the one in the first embodiment.

Controller 1407 generates interface information using the IP identifier obtained and additional information about the device (step 1604).

The interface information includes device-dependent-information for controlling the device, i.e. the information written by script languages such as Hyper Text Makeup Language (HTML), Extensible Makeup Language (XML), or JavaScript (Java and JavaScript are trademarks of Sun Microsystems, Inc.), programs including a user interface such as Java applet, and objects including application programming interface (API) of device-control-method.

Next, virtual-device-controller 1407 registers the interface information previously generated to IP directory 1415 following a protocol specified in respective Plug-and-Play specifications (step 1605).

As a result, the IP network can manipulate a newly plug-in HAVi device without searching for an access identifier or an access method.

Virtual device controller 1407 registers a set of the HAVi address already supplied and ID information on the IP side to the address-correspondence-table via address-correspondence-controller 1406 described in the first embodiment, then turns the virtual device to the standby status (step 1606).

As shown in FIG. 13, controller 1407 controls the correspondence between the identifier of a service on the internet (the VTR in this embodiment) and an identifier to be viewed from the IP side. The VTR's identifier has been obtained on step 1504. The identifier to be viewed from the internet side is specified in the specifications of respective Plug-and-Play.

Upon receiving a command (e.g. Record a program with the VTR.) from an IP device, the virtual device converts the command as same as in the first embodiment, and sends the converted command to the HAVi network via the HAVi network input/output means.

An operation at plugging-out an HAVi device is demonstrated with reference to the flowcharts shown in FIGS. 15 and 16.

When the event notice on step 1503 indicates a service-out (GoneSoftwareElement global event in the HAVi specification), HAVi plug-in detector 1406 requests controller 1407 to delete the service. Controller 1407 searches HAVi registry 1413 with a key of HAVi address (SEID)-additional information to the event, thereby obtaining HUIDs of the remained devices. Next, controller 1407 searches the service-correspondence-control-table shown in FIG. 13 (step 1610) following the steps shown in FIG. 16, then determines whether or not the service-out is still plugged-in (step 1611).

Controller 1407 deletes the entry from the address-correspondence-table and service-correspondence-table via address-correspondence-controller 1409 (step 1612 and step 1613).

Controller 1407 also notifies IP directory 1415 of the service-out (step 1614), then stops the virtual device (step 1615).

When the HAVi service is out (a device is removed from the network in this embodiment) through these steps, the service is deleted also from the IP directory, so that the service-out can be recognized from the IP network.

The GW apparatus in accordance with the third embodiment as discussed above allows the IP devices to detect a device newly plugged-in the HAVi network as well as to obtain the interface information via the IP registry.

Exemplary Embodiment 4

A gateway (GW) apparatus in accordance with the fourth embodiment is demonstrated hereinafter with reference to FIG. 17 through FIG. 20.

Figure 17:
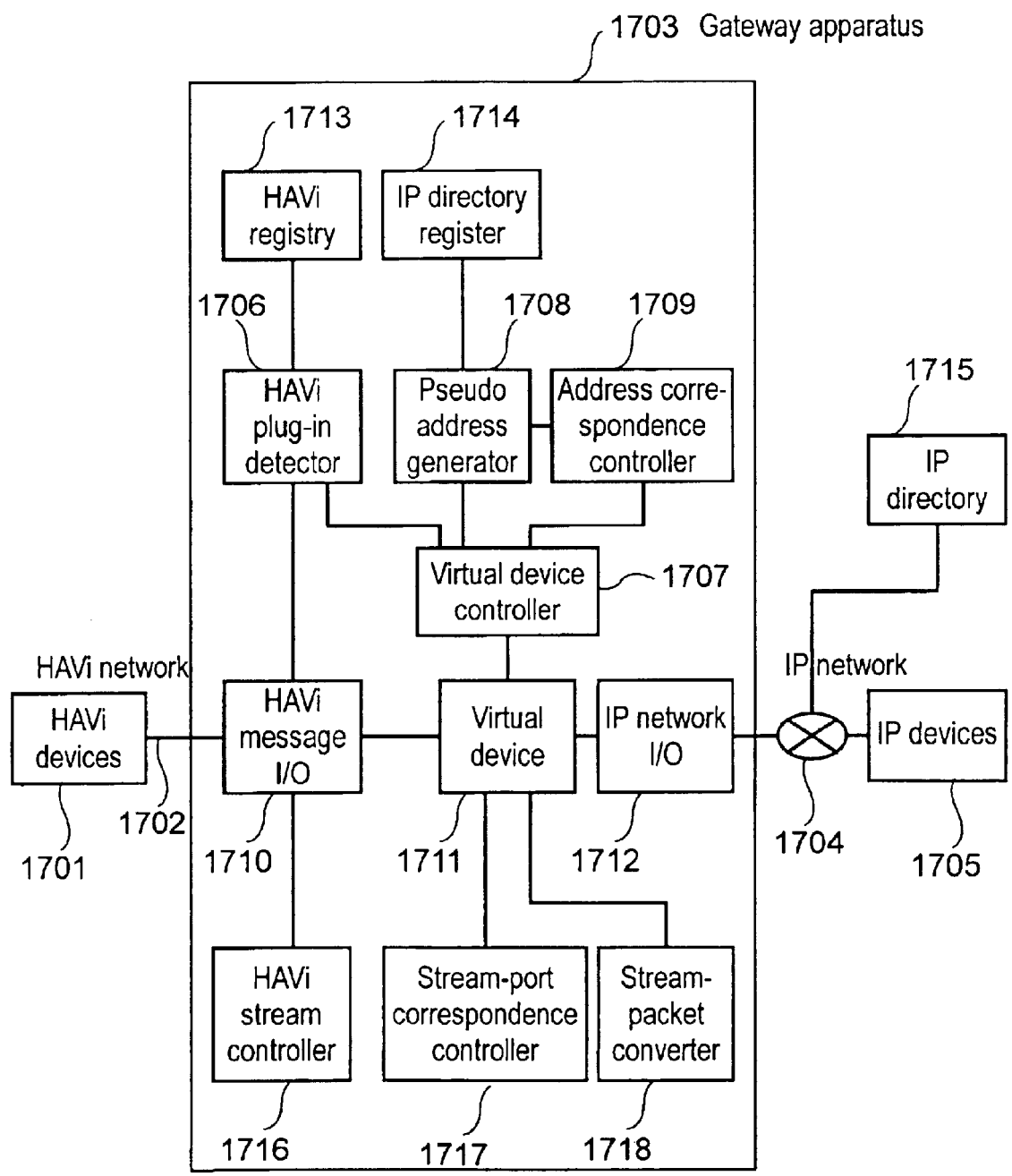
FIG. 17 is a block diagram illustrating a function of a GW apparatus in accordance with a fourth exemplary embodiment of the present invention.

FIG. 17 is a block diagram illustrating functions of the GW apparatus.

HAVi stream controller 1716 allows HAVi devices in compliance with the HAVi spec. to carry out a stream-transfer among the devices. Virtual device 1711 has additional functions to those described in the first embodiment, i.e. (1) establishing a connection to the IP devices, and (2) keeps a band when necessary. Stream-port-correspondence-controller 1717 controls the correspondence between HAVi Functional Component Module Plug (FCM Plug)—a control unit of stream in compliance with the HAVi spec. on the GW apparatus—and IP stream ports. Stream-packet-converter 1718 converts HAVi-stream-packet to IP-stream-packet and vice versa, then sends out them. Other elements function as same as those described in the first through third embodiments.

Figure 18:
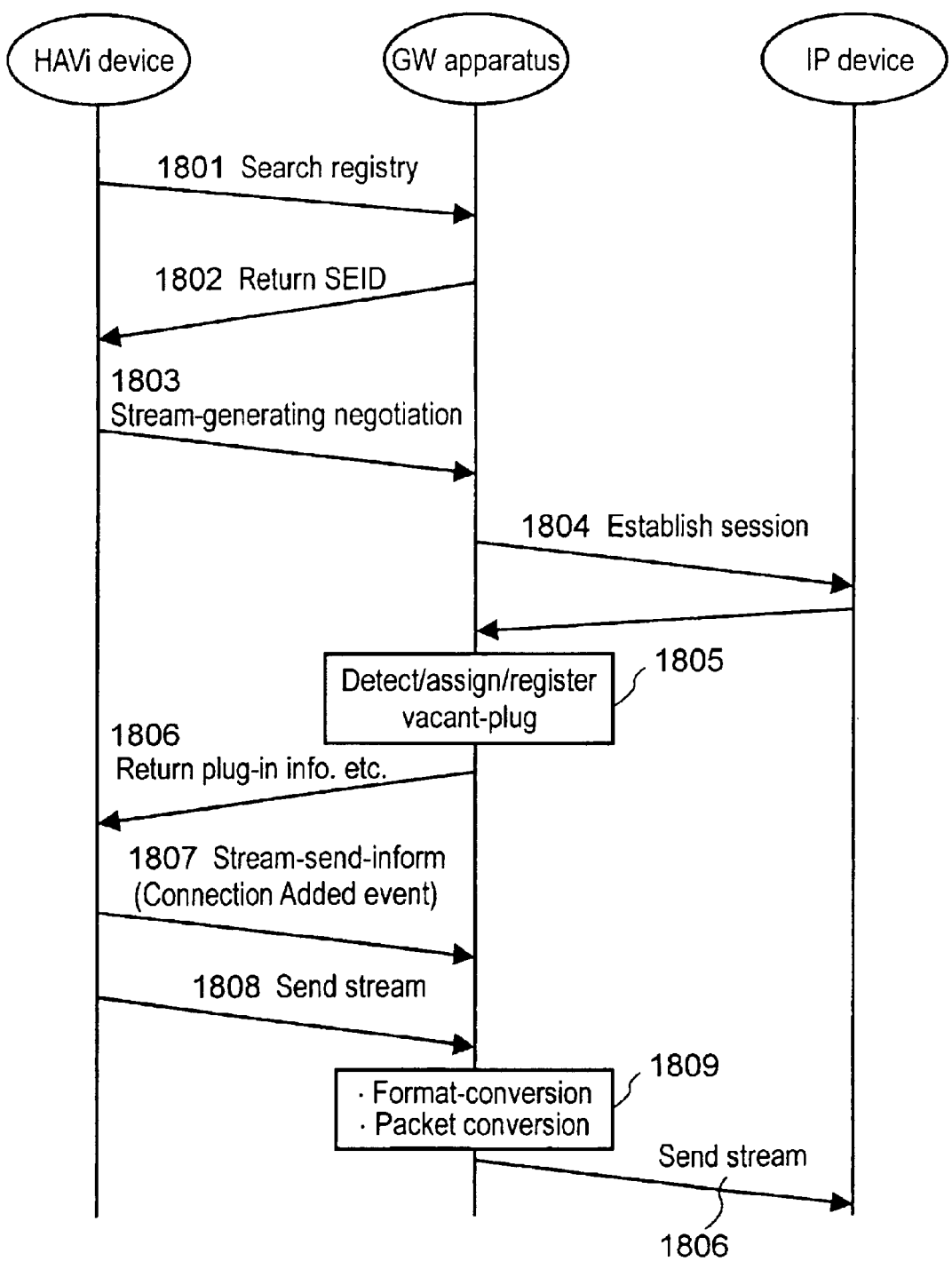
FIG. 18 illustrates an operation sequence for establishing a stream connection in accordance with the fourth exemplary embodiment of the present invention.

FIG. 18 illustrates a sequence of producing a stream connection between the HAVi device and the IP device via the GW apparatus.

Figures 19, 20:
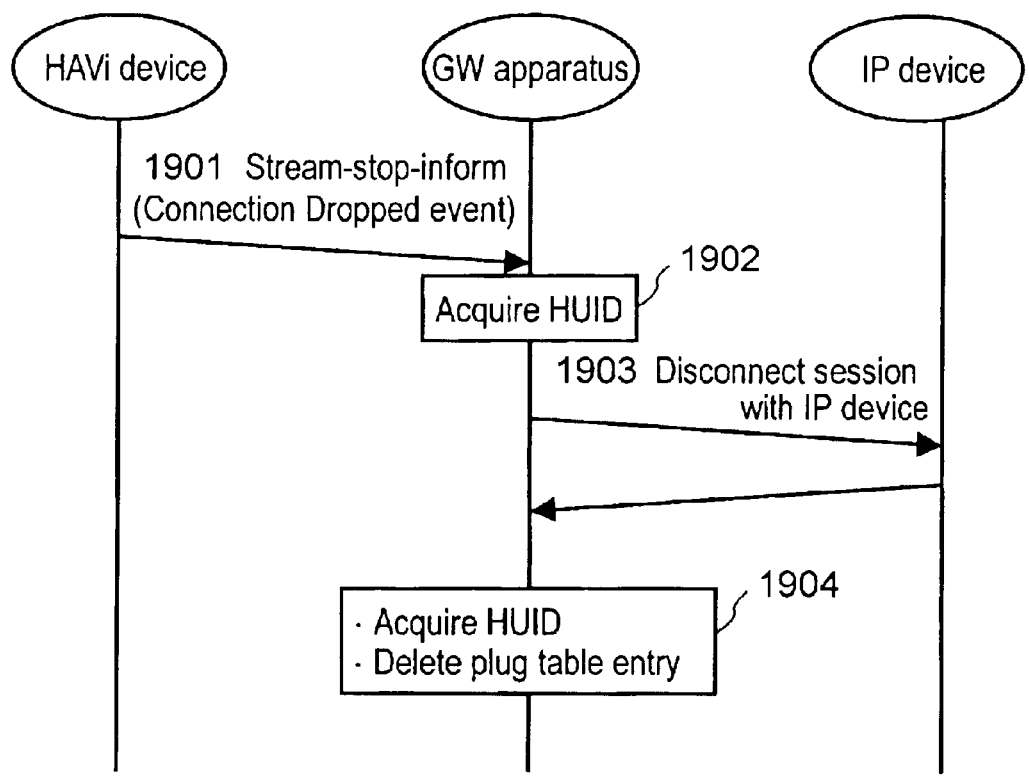
FIG. 19 illustrates an operation sequence for discontinuing the stream connection in accordance with the fourth exemplary embodiment of the present invention.
FIG. 20 is a plug-control-table in accordance with the fourth exemplary embodiment of the present invention.

FIG. 19 illustrates a sequence of cutting the stream produced through the sequence shown in FIG. 18.

In FIG. 20, stream-port-correspondence-table 2001—indicating the correspondence between the stream ports—includes, e.g. an ID 2002 of HAVi FCM (HAVi Unique ID) which can handle the stream, FCM flag No. 2003 of HAVi stream includes Plug control Register (PCR)NO. 2004 specified by IEC 61833 and IP port No. 2005 for producing a stream connection on the IP side.

Based on the sequence shown in FIG. 18, a process of producing the stream connection between the HAVi device and IP device is described with reference to FIG. 17 and FIG. 20.

When IP device 1705 capable of receiving videos is plugged-in, the device is registered in HAVi registry 1713 of GW apparatus 1703 together with in IP directory 1715. At this moment, the GW apparatus collects and stores the following device-information:

(1) Is this device capable of handling a stream?

(2) What kind of data-rate does this device handle?

Next, based on the sequence shown in FIG. 18, the process that the HAVi device sends a stream to the plugged-in IP device is demonstrated with reference to FIG. 17 and FIG. 20.

HAVi device 1701 searches the HAVi registry for video-receivable devices (step 1801).

Since IP device 1706 has been registered as a video-receivable device, GW apparatus 1703 returns the SEID—the HAVi address of virtual device 1711—to the HAVi device (step 1802).

The HAVi device starts a negotiation for producing a stream following the steps specified by the HAVi spec. The HAVi spec. specifies to make the following inquiries as a pre-process to the producing of stream connection (step 1803):

(1) status of using plugs;
(2) What kind of stream types can the device handle?

The virtual device of GW apparatus 1703 in this embodiment acts for the IP device, therefore, the virtual device inquiries an actual status of the network and holds the band necessary for transmission between the GW apparatus and the IP device (step 1804).

Next, the virtual device detects a physically vacant plug in the GW apparatus per se, and registers it in a plug-control-table using stream-port-controller 1717 (step 1805).

In the plug-control-table, following items are recorded as shwon In FIG. 20: HUID of the virtual device, FCM plug No. which is used as an identifier for stream transmittance/receipt used in a protocol, a physical Plug Control Register's (PCR) No. specified by IEC 61883, and a port No. used on the IP side.

After these processes, the GW apparatus replies to the HAVi device inquiring about the stream production via HAVi-stream-controller 1716 (step 1806).

When the stream is ready for transmission, the HAVi device instructs the HAVi middle wear to transmit the stream. At this time, an event notice (ConnectionAdded global event) of the stream transmission is sent out (step 1807).

When the stream arrives at the GW apparatus, an IEC 61883 packet is converted to an IP packet for transmitting thereof to the IP device. For instance, a DV format is converted to MPEG appropriate data-format on the IP if necessary. The GW apparatus sends the converted stream to the IP device.

In this embodiment, the stream-transfer from the HAVi device to the IP device is described. The transfer on the other way around can be achieved in the same manner.

Based on the sequence shown in FIG. 19, an operation of cutting the stream-connection is demonstrated with reference to FIG. 17 and FIG. 20.

When the HAVi device issues an instruction of cutting the stream, the HAVi middle wear sends an event notice (Connection Dropped) of stream-stop to the HAVi network. Stream controller 1716 of GW apparatus 1703 detects this event and searches HUID of the source of additional information to the event for the plug-control-table shown in FIG. 20 to find the connection cut (step 1902).

The GW apparatus specifies the IP connection to be cut from the table, and carries out the cut-process (step 1903).

The entry having been cut out is detected from the plug-control-table (step 1904).

In this embodiment, the cut process of the stream-connection carried out by the HAVi device is described. The cut process by the IP device can be done in the same manner.

The GW apparatus of the present invention realizes the stream-transfer between the HAVi device and IP device.

Exemplary Embodiment 5

A gateway (GW) apparatus in accordance with the fifth exemplary embodiment is demonstrated with reference to Fig. FIG. 21–FIG. 26.

Figure 21:
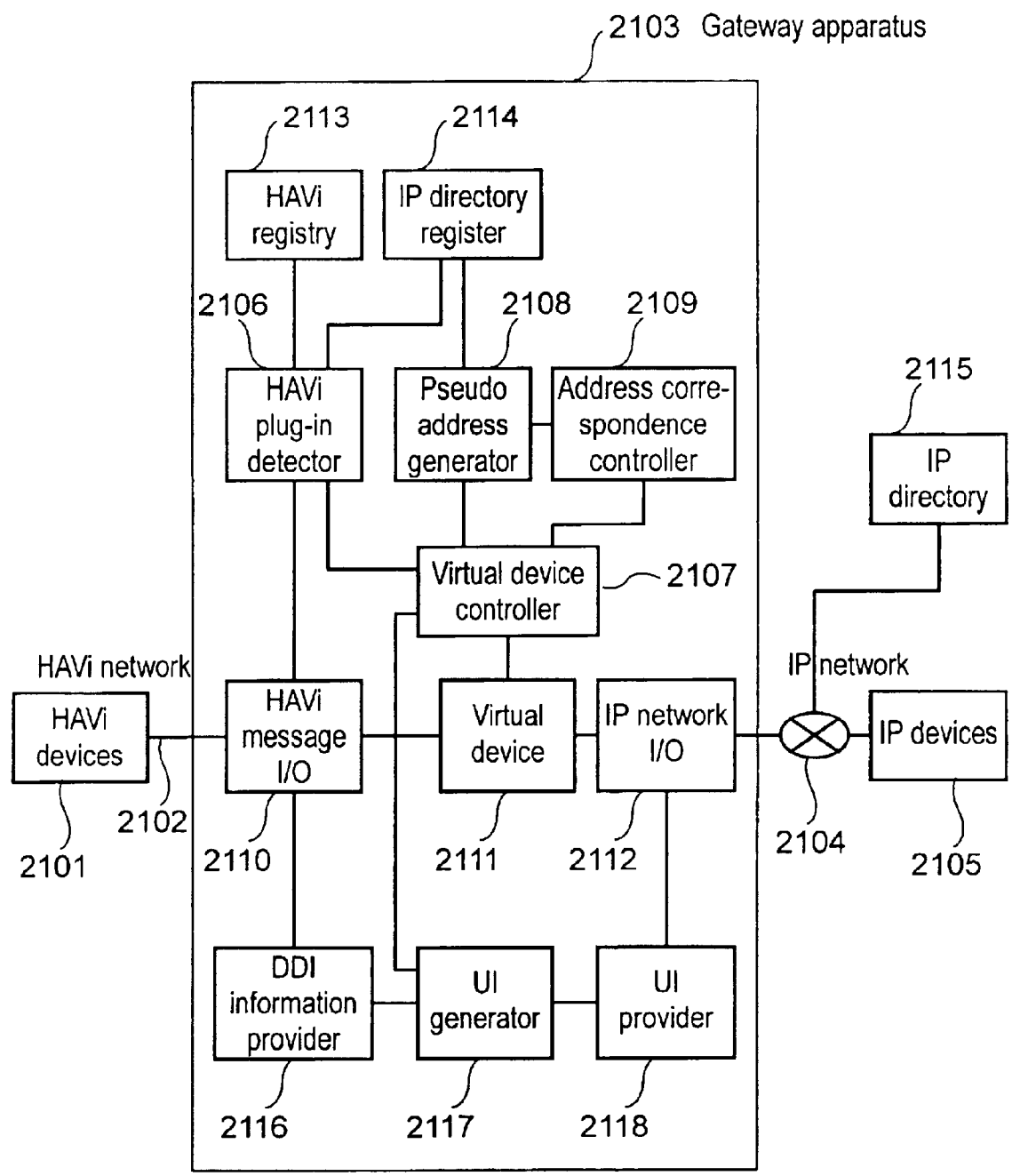
FIG. 21 is a block diagram illustrating a function of a GW apparatus in accordance with a fifth exemplary embodiment of the present invention.

FIG. 21 is a block diagram illustrating functions of the GW apparatus.

Data Driven Interaction (DDI) data acquirer 2116 carries out a communication using an HAVi device supplying DDI function, and DDI protocol, so that acquirer 2116 collects and stores information necessary for forming a GUI which manipulates the HAVi device. User interface (UI) generator 2117 converts the DDI information to the GUI format (such as HTML, Java applet) which is used in general on the internet. UI generator 2117 has information of correspondence between DDI Element—elements of HAVi GUI—and components (Java Abstract Window Toolkit (AWT)) of GUI used in general on the internet. UI provider 2118 accepts a request of a communication application (WWW browser, etc.) from client-IP-device 2105 on the internet, and transmits the converted GUI to client-IP-device 2105. Virtual device 2111 has the following additional functions to those described in the first embodiment: Device 2111 accepts a request from IP device 2105 via the GUI, and communicates to the HAVi device with the DDI protocol. In other words, Device 2111 functions as DDI controller in the HAVi spec. Other elements operate as same as those described in the first, second and third embodiments.

Figure 22:
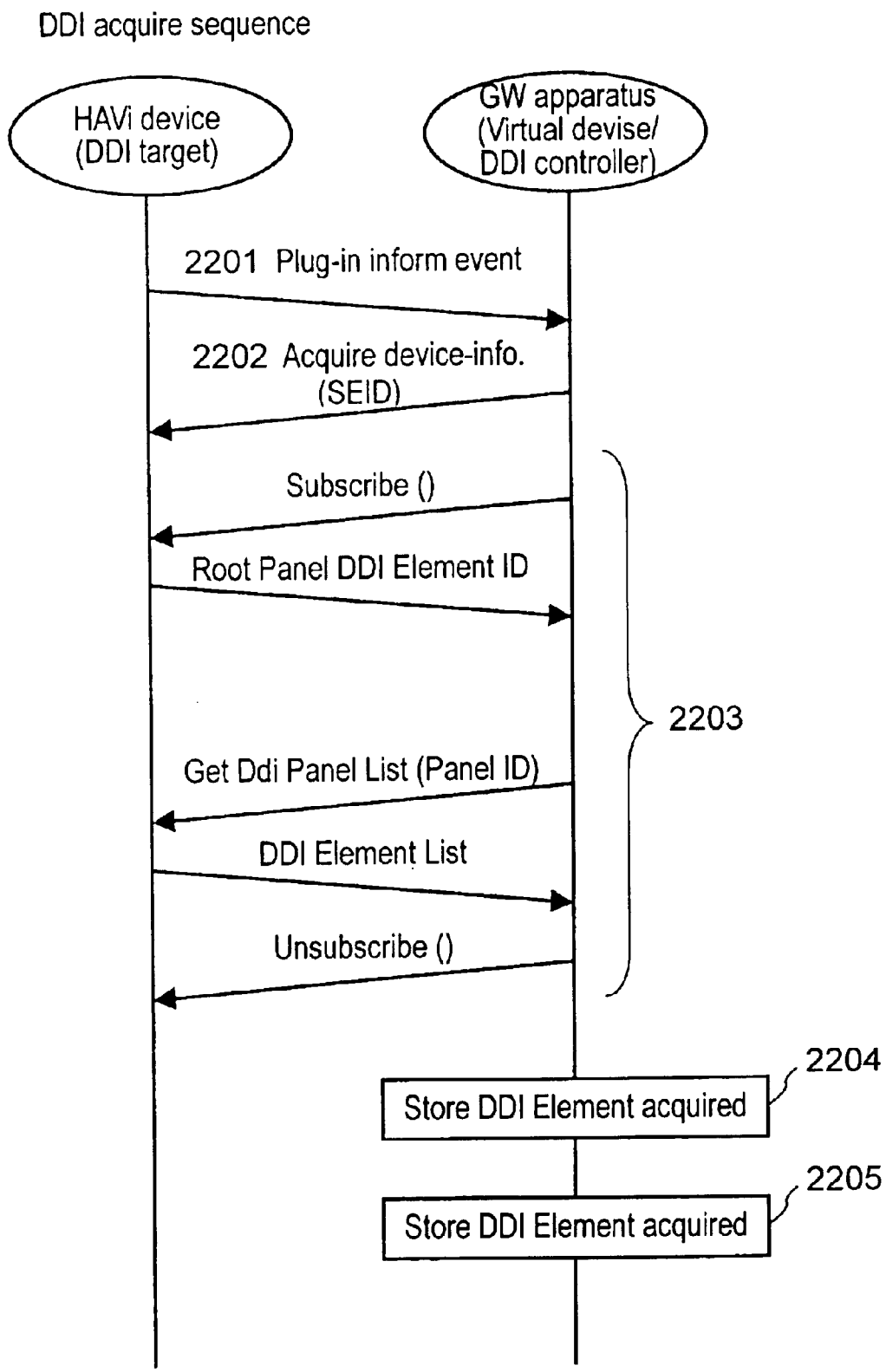
FIG. 22 illustrates an operation sequence of the GW apparatus in the fifth embodiment for obtaining information of Data Driven Interaction (DDI).

FIG. 22 shows a sequence illustrating an operational flow of the GW apparatus acquiring the DDI information of the HAVi device after the HAVi device is plugged-in.

Figure 23:
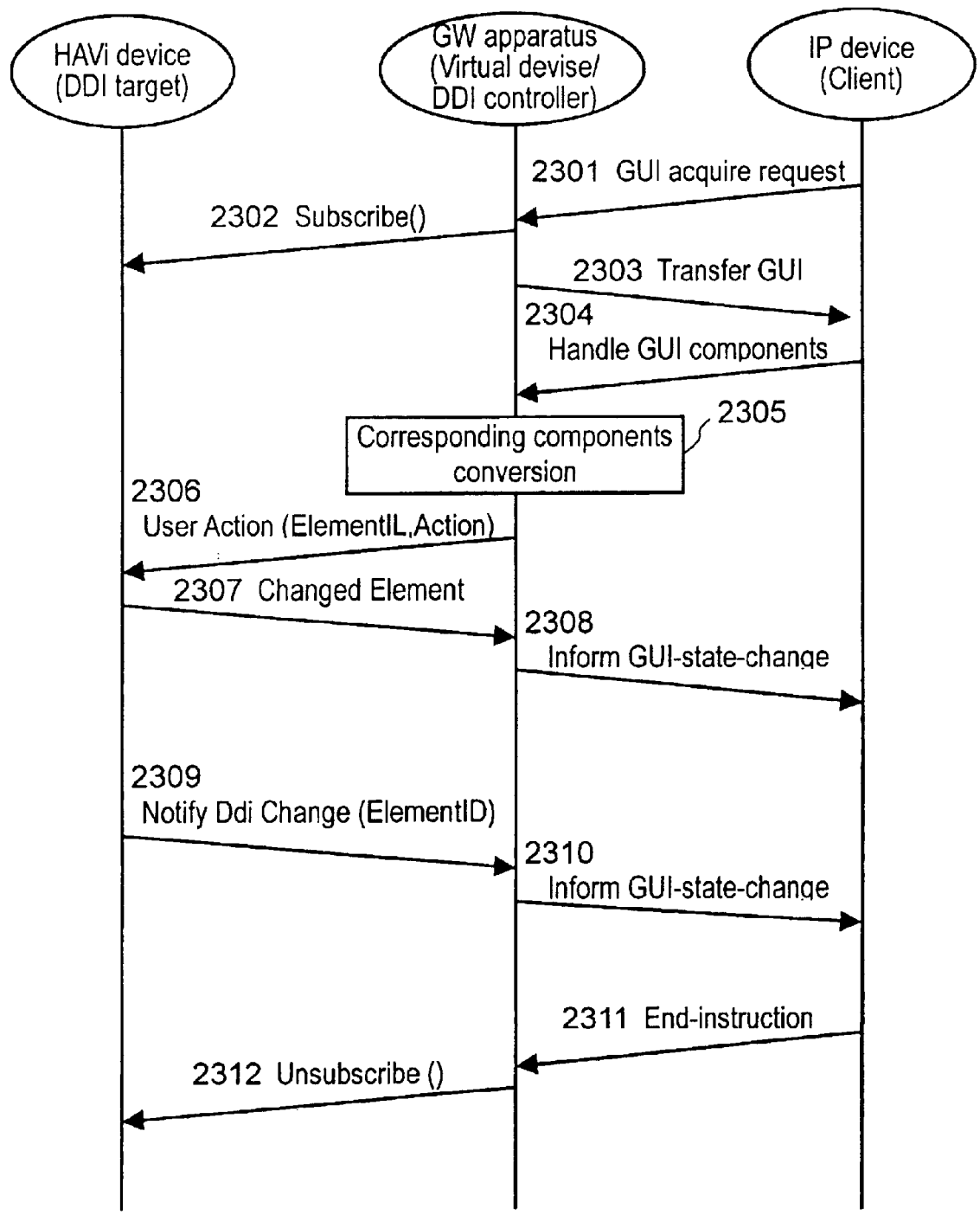
FIG. 23 illustrates an operation sequence of GUI in the fifth embodiment.

FIG. 23 shows a sequence illustrating an operational flow where a client device on the internet makes a request for the HAVi device via the GW apparatus using GUI definition information produced by the GW apparatus.

Figures 24, 25, 26:
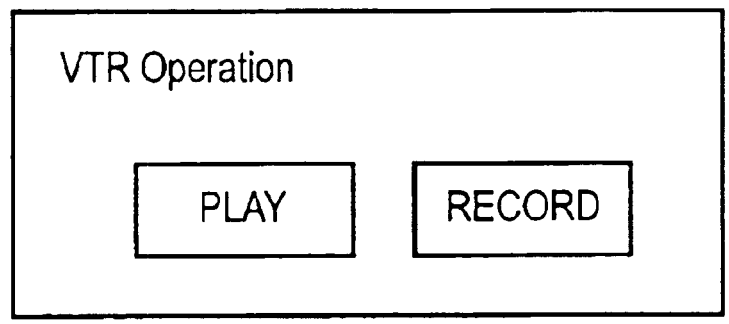
FIG. 24 shows a GUI based on DDI information in accordance with the fifth exemplary embodiment of the present invention.
FIG. 25 shows DDI information in accordance with the fifth exemplary embodiment of the present invention.
FIG. 26 shows a GUI code.

FIG. 24 shows a GUI produced by using the DDI information. FIG. 25 shows a part of DDI information collected by acquirer 2116. FIG. 26 shows a part of source code used in producing the GUI by using the DDI information shown in FIG. 25, the GUI being employed on the internet.

The flow from acquiring the DDI information to generating the GUI for the IP is described with reference to the sequence shown in FIG. 22.

When HAVi device 2101 is plugged-in HAVi network 2102, plug-in detector 2106 detects the event (step 2201), then GW apparatus 2103 searches HAVi registry 2113 with SEID as a key for the information about the plugged-in HAVi device (step 2202).

In the device information, an attributive value (GUI_Requirement) reserved in the HAVi spec, i.e. whether or not supporting DDI, is registered.

When GW apparatus 2103 determines that DDI is supported, apparatus 2103 collects the DDI information from HAVi device 2101 with DDI protocol (step 2203).

GW apparatus 2103 stores the DDI element acquired by DDI acquirer 2116 as the information shown in FIG. 25 (step 2204).

Next, based on the DDI information stored, UI converter 2117 produces definition information of GUI utilizing the knowledge corresponding to components of the GUI on the IP side (step 2205).

FIG. 26 shows an example of the definition information (a program code in this case) produced from the DDI information shown in FIG. 25, and the example shown describes only the part that handles a GUI manipulating event. When "PLAY" button is depressed as the GUI manipulating event, a method called CallDDi( ) of a server in the GW apparatus is transmitted to the HAVi device to be manipulated (target HAVi device) together with the identifier of the GUI component (Element ID shown in FIG. 25). FIG. 24 shows an example where the components in FIG. 25 are developed on a GUI panel. In this example, components of panel and button are produced using Label text information that is essential attribution to the DDI Element. The Element ID is an identifier of the GUI component allotted by the target HAVi device, and the target device recognizes which component is manipulated with this ID.

FIG. 23 shows a flow of operations how a client-IP-device manipulates an HAVi device via the GW apparatus.

First client-IP-device 2105 sends a request of acquiring a GUI from a general UI such as WWW browser (step 2301).

In the GW apparatus, UI provider 2118 receives this request and starts a communication session with a target HAVi device using a DDI protocol (step 2302), and transfers the GUI produced (step 2303).

IP device 2105 displays components (e.g. button) of GUI acquired, and controls HAVi device 2101 following a user's manipulation. At this time, a method of virtual device 2111 in GW apparatus 2103 is called up by an event process indicated by the code described in FIG. 26. The information about which GUI component is how manipulated is conveyed to virtual device 211. For instance, Element ID=1 of the GUI component and an action (Pressed) are conveyed (step 2304).

Based on this information, virtual device 2111 sends a User Action method of the DDI protocol to the target HAVi device with the DDI protocol (step 2306).

HAVi device 2101 receives this command, then operates as specified by the command, and notifies a change of status when necessary (step 2307).

The server interprets this reply and, if necessary, transfers it to IP device 2105. After this, every time IP device 2105 is manipulated by the GUI, the process from step 2304 to step 2307 is repeated.

If some change occurs on the HAVi device (e.g. a tape comes to end) and this change is necessary to be notified to the IP device, HAVi device 2101 issues NotifyDdiChange of DDI protocol (step 2309), the GW apparatus transfers it to notify the client of the change (step 2310).

When the client notifies the end of manipulation (step 2311), virtual device 2111 issues "UNSubscribe ( )method" of DDI protocol to the target HAVi device, then closes the manipulation session (step 2312).

The GW apparatus in accordance with this fifth embodiment allows an IP device to display UI for manipulating an HAVi device.

Exemplary Embodiment 6

Figure 29:
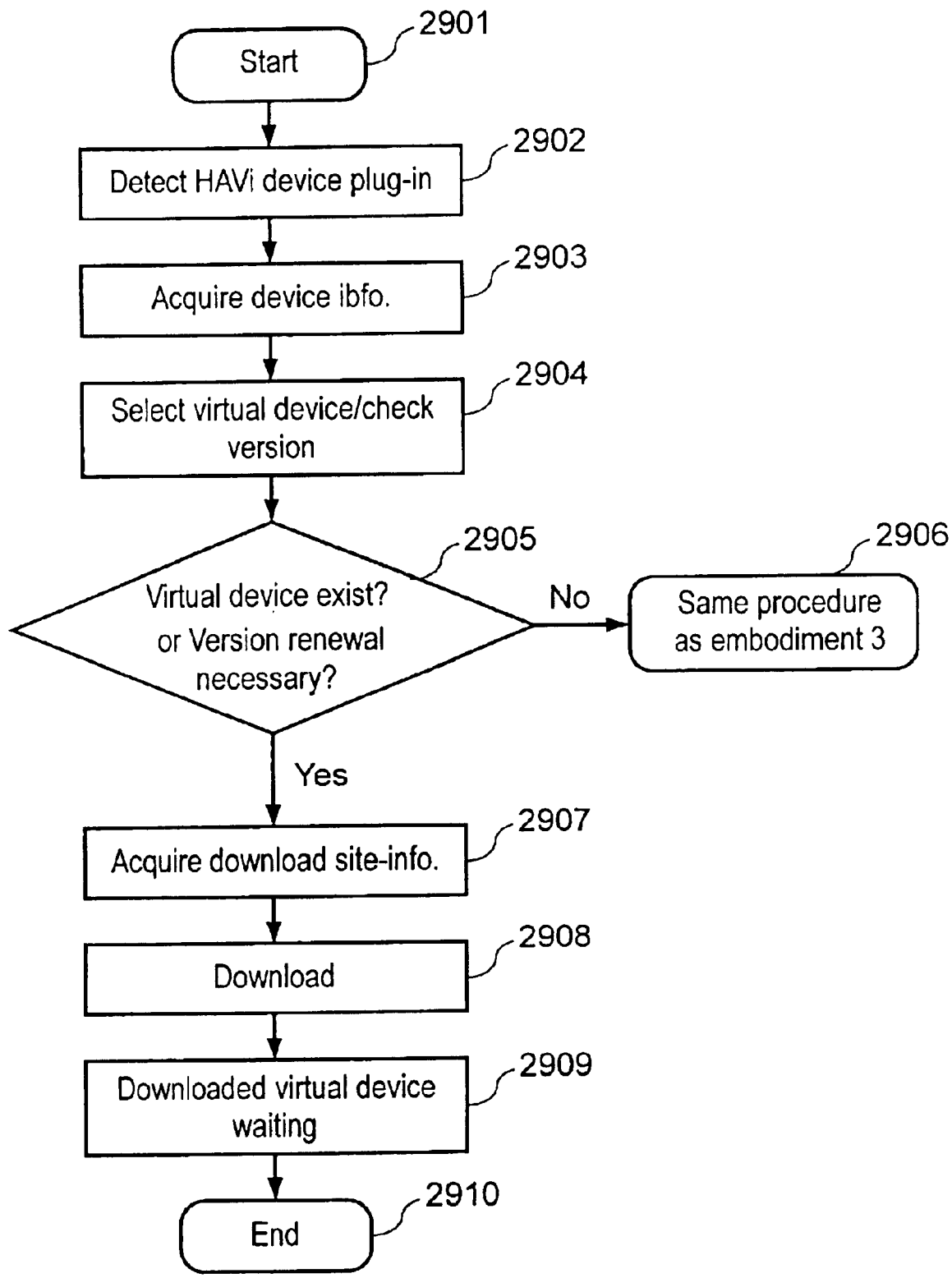
FIG. 29 is a flowchart illustrating an operation of down loading the virtual device in accordance with the sixth exemplary embodiment of the present invention.

A gateway (GW) apparatus in accordance with the sixth embodiment is demonstrated hereinafter with reference to FIGS. 27–29.

Figure 27:
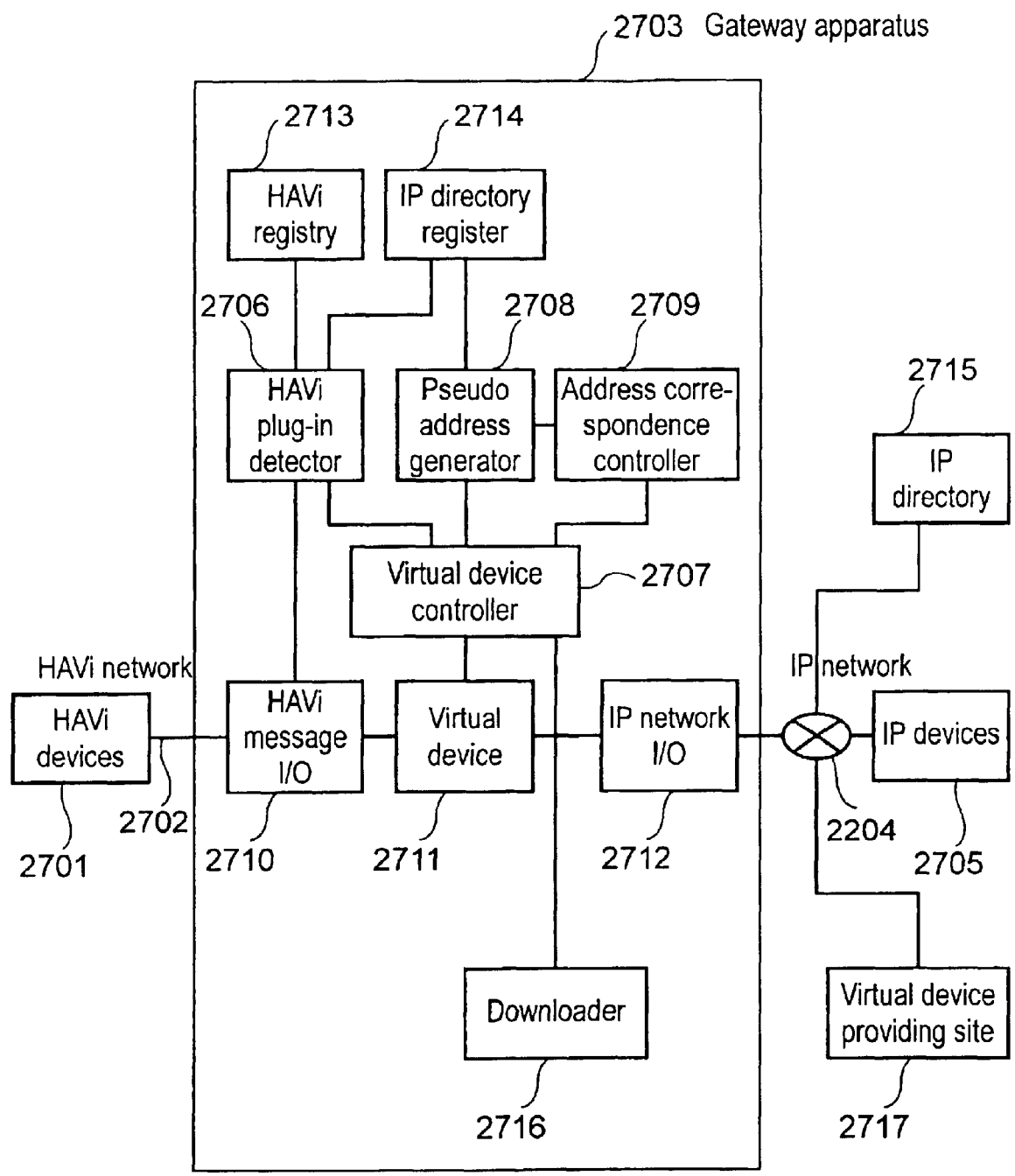
FIG. 27 is a block diagram illustrating a function of a GW apparatus in accordance with a sixth exemplary embodiment of the present invention.

In FIG. 27, virtual-device-provider-site 2717 provides a virtual device functioning as a GW on the internet outside. Device-manufactures and www-sites operated by providers are the examples of this site.

Downloader 2716 accesses to site 2717 and downloads the information about the virtual device into the device 2711. Downloader 2716 has the information as shown in FIG. 28 about the device to be downloaded. Virtual-device-controller 2707 has the following additional functions to that described in the third embodiment:

At the plug-in of the HAVi device, if a virtual device supposed to function as a GW between this HAVi device and an IP device is not included in virtual device 2711, this particular virtual device should be downloaded to device 2711 from site 2717 by downloader 2716. The downloader also can download a virtual device of a version different from the now-using device for replacing. Other elements function as same as those described in embodiments 1–3.

Based on the flowchart in FIG. 29, a flow of operations of the GW apparatus is described with reference to FIG. 27 and FIG. 28 illustrating a table to which the virtual device is downloaded.

When a new HAVi device 2701 is plugged-in HAVi network 2702, HAVi plug-in detector 2706 receives an event, so that the plug-in is notified to virtual-device-controller 2707 (step 2902).

Next, controller 2707 searches HAVi registry 2713 for the information about the plugged-in device (step 2903).

Controller 2707 prepares a virtual device for accessing to the HAVi device from the internet (step 2904).

The process discussed above is the same as that in the third embodiment.

Controller 2707 checks whether or not a virtual device for the HAVi device plugged-in on step 2903 exists in provider-site 2717, and also checks, if necessary, a version of the virtual device and determines to update the version (step 2905).

When the virtual device exists in site 2717 and the version does not need a version-up, the process onward is the same as that described in the third embodiment (step 2906).

When the virtual device is not available or the version should be updated, controller 2707 searches the information about provider-sites as shown in FIG. 28 with the key of device information (device No. a type of device, a maker) acquired from HAVi registry 2713, so that controller 2707 acquires the information (URL in this case) about a virtual-device-provider outside the GW (step 2907).

Based on this provider's information, downloader 2716 downloads the virtual device into site 2717 via IP network input/output means 2712 (step 2908).

Controller 2707 assigns a pseudo address to the virtual device downloaded in the same way as in the third embodiment, and registers the virtual device to IP directory 2715, then turns the virtual device into standby status (step 2909).

The GW apparatus in accordance with the sixth embodiment keeps functioning as a GW by acquiring necessary information from the network when the information held by the GW apparatus cannot allow the GW apparatus to function as a GW.

In conclusion, the gateway (GW) apparatus and the method of the present invention realizes the following functions:

1. The GW apparatus and the method realize communications between IP devices and HAVi devices.
2. The GW apparatus and the method allow a HAVi device to detect a device plugged in the IP network and acquire the interface information.
3. The GW apparatus and the method allow an IP device to detect a device plugged in the HAVi network and acquire the interface information.
4. The GW apparatus and the method realize a stream transfer between HAVi devices and IP devices.
5. The GW apparatus and the method allow an IP device to display UI for manipulating an HAVi device.
6. The GW apparatus and the method can maintain functioning as a gateway by acquiring necessary information from the network when the information locally held by the GW apparatus is not enough for itself to function as the gateway.

What is claimed is:

1. A gateway (GW) apparatus for communicating between networks, said GW apparatus comprising:
   (a) first message input/output means for sending and receiving a message to/from a first network;
   (b) second message input/output means for communicating with a second network based on an internet protocol (IP);
   (c) a first plug-in detector for detecting a plug-in of a first device to the first network;
   (d) a virtual device functioning as a gateway for the first device plugged in the first network and a second device plugged in the second network to communicate with each other, said virtual device using table look-up to convert commands issued by each of the first and second devices into commands the second and first devices, respectively, comprehend so that the table includes correspondences between commands used in the first network and the second network for converting the commands between protocols used in the first network and the second network;

(e) a virtual-device-controller for providing said virtual device corresponding to the first device plugged-in with an IP identifier for the second network to access said virtual device responsive to information supplied from said first plug-in detector;

(f) a pseudo-address generator for generating a pseudo address for said virtual device to communicate with the first device in the first network upon receiving a connection request from the second device in the second network, and for outputting the pseudo address to said virtual-device-controller; and (g) an address-correspondence-controller for controlling correspondence between the IP identifier and the pseudo address provided to said virtual device by said virtual-device-controller.

2. The GW apparatus as defined in claim 1 further comprising:

(h) a second plug-in detector for detecting a plug-in of the second device by monitoring "a directory supplying information about the second device in the second network", and (i) a registry register for registering In a registry in the first network, wherein said virtual-device-controller further acquires the information about the second device from the directory, and establishes a virtual device corresponding to the second device based on the information acquired, wherein said GW apparatus allows the first device to detect the second device plugged in the second network and acquires interface information via the registry.

3. The GW apparatus as defined in claim 1 further comprising:

(j) a directory register for registering information about the first device plugged in the first network to a directory of the second network, wherein said first plug-in detector detects the plug-in of the first device by monitoring an event in the first network, wherein said virtual-device-controller acquires information about the first device plugged in the first network from a registry on the first network, and has said virtual device include a virtual device corresponding to the first device plugged in the first network based on the information acquired, wherein said GW apparatus allows the second device to detect the first device plugged in the first network via the directory of the second network.

4. The GW apparatus as defined in claim 3 further comprising:

(k) a stream controller for controlling a stream transfer between devices on the first network;

(l) a stream-port-correspondence-controller for controlling correspondence between a stream input/output identifier on the first network and a stream port on the second network;

(m) a stream packet converter for converting a stream packet on the first network to a stream packet on the second network and vice versa, and sends/receives thereof;

wherein said virtual device establishes a stream connection to the second device plugged in the second network, and has a stream generator for holding a band;

wherein said GW apparatus transfers a stream between a device on the first network and a device on the second network.

5. The GW apparatus as defined in claim 3 further comprising:

(o) an information acquirer for acquiring information necessary for forming a user interface;

(p) a user interface (UI) generator for generating a UI to be used on the second network based on the information acquired; and (q) a UI provider for transferring the UI generated when the second device requests to access to the first network;

wherein said virtual-device-controller detects a plug-in of a device to the first network, and determines whether or not the device plugged-in supports a protocol on the first network, and when said controller determines the protocol is supported, said information acquirer acquires information for forming the UI by communicating with the device;

wherein said GW apparatus allows the second device on the second network to display the UI for manipulating the first device on the first network.

6. The GW apparatus as defined in claim 1 further comprising:

(r) a registry of the first network;

(s) a downloader for downloading information to said virtual device by accessing to an information-provider-site providing information about said virtual device;

wherein said virtual-device-controller detects a plug in of the first device in the first network, searches the registry for information about the first device plugged in the first network, and acquires the information;

wherein said virtual-device-controller further includes an information acquirer for acquiring the information from the provider site based on the first device information acquired from the registry when said controller determines one of two cases; (i) a first case where said virtual device does not include a virtual device corresponding to one of the first device plugged in the first network and the second device plugged in the second network, and (ii) a second case where said virtual-device-controller determines that said virtual device needs to update a software version thereof.

7. The GW apparatus as defined in claim 1 wherein said virtual device includes:

(d-1) a connection controller for controlling a correspondence between the first device and the second device;

(d-2) a command converter for converting a first command issued from the first network into a second command issued from the second network and vice versa;

(d-3) a command-correspondence-controller for controlling a correspondence between the first and the second commands; and (d-4) an address converter for transferring a first message issued from the first network to the second network and vice versa.

8. A method of gateway for communicating between a first device plugged in a first network and a second device plugged in a second network by using a virtual device; said method comprising:

(a) transmitting and receiving a message to/from the first network;

(b) communicating with the second network following an internet protocol (IP);

(c) acquiring information about the first device by detecting a plug-in of the first device in the first network;

(d) providing an IP identifier to the virtual device corresponding to the first device plugged in the first network responsive to the information acquired in step (c) for accessing to the virtual device from the second network;

(e) upon receiving a connection request from the second device, the virtual device generates a pseudo address for communicating with the first device plugged in the first network;

(f) using table look-up to convert commands issued by each of the first and second devices into commands the second and first devices, respectively, comprehend so that the table includes correspondences between commands used in the first network and the second network for converting the commands between protocols used in the first network and the second network; and (g) communicating between the first network and the second network responsive to the correspondence between the pseudo address provided to the virtual device and the IP identifier.

9. The method of gateway as defined in claim 8 further comprising:

(g) detecting a plug in of the second device in the second network by monitoring a directory which provides information about the second device in the second network;

(h) providing the virtual device with an address, and registering the address to a registry of the first network;

wherein said step (d) further comprising:

(d-1) acquiring information about the second device from the directory, and setting the virtual device corresponding to the second device based on the information acquired; and (d-2) detecting the second device plugged in the second network from the first device via the registry, and acquiring interface information.

10. The method of gateway as defined in claim 8 further comprising:

(i) detecting the plug in of the first device by monitoring an event in the first network;

(j) registering the information about the first device to a directory which provides information about the second device in the second network;

wherein said step (d) further comprising:

acquiring the information about the first device plugged in the first network from a registry of the first network, so that the virtual device includes a virtual device corresponding to the first device;

detecting the first device plugged in the first network from the second device via the directory, and acquiring interface information.

11. The method of gateway as defined in claim 10 further comprising:

(o) acquiring information for forming a user interface;

(p) generating the user interface to be used in the second network using the information acquired; and (q) transferring the user interface upon a request of accessing to the first device from the second device;

wherein said step (d) further comprising:

detecting the plug in of the first device in the first network;

determining whether or not the first device plugged in the first network supports a protocol of the first network for providing the user interface; and when determining the first device supports the protocol, acquiring information for forming the user interface by communicating with the first device;

wherein said method allows the second device to display the user interface for manipulating the first device.

12. The method of gateway as defined in claim 8 further comprising:

(k) carrying out a stream transfer between devices of the first network;

(l) storing a correspondence between an identifier of stream input/output plug of the first network and a stream port of the second network;

(m) converting a stream packet of the first network to/from a stream packet of the second network, and transmitting/receiving the packet converted; and (n) establishing a stream connection to the second device plugged in the second network, and holding a band;

wherein said method carries out the stream transfer between the first network and the second network.

13. The method of gateway as defined in claim 8 further comprising:

(r) accessing to an information provider site which provides information about the virtual device, and downloading the information to the virtual device, wherein said step (d) further comprising:

detecting the plug in of the first device, searching a registry of the first network, and acquiring the information about the first device, wherein said step (e) further includes:

acquiring information from a provider site based on the device information acquired from the registry when one of two cases is determined; (i) a first case where the virtual device does not include another virtual device corresponding to one of the first device plugged in the first network and the second device plugged in the second network, and (ii) a second case where the virtual device needs to update a software version thereof.

14. The method of gateway as defined in claim 8, wherein said step (d) further comprising:

storing a connection between the first and second devices into the virtual device;

converting a first command issued from the first network into a second command, and the second command issued from the second network into the first command so that both of the commands can be executed by either one of the first and second network;

storing a correspondence between the first and the second commands into the virtual device; and transferring messages issued from the first network and the second network between the first and the second networks by the virtual device following the connection stored as well as the command stored.

* * * * *